US012610363B2

(12) United States Patent
Agiwal

(10) Patent No.: US 12,610,363 B2
(45) Date of Patent: Apr. 21, 2026

(54) METHOD AND APPARATUS FOR DATA TRANSMISSION IN RRC INACTIVE

(71) Applicant: Samsung Electronics Co., Ltd., Suwon-si (KR)

(72) Inventor: Anil Agiwal, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 334 days.

(21) Appl. No.: 18/191,447

(22) Filed: Mar. 28, 2023

(65) Prior Publication Data

US 2023/0328715 A1 Oct. 12, 2023

(30) Foreign Application Priority Data

Mar. 29, 2022 (KR) ........................ 10-2022-0039154

(51) Int. Cl.
*H04W 72/1263* (2023.01)
*H04W 56/00* (2009.01)
(Continued)

(52) U.S. Cl.
CPC ... *H04W 72/1263* (2013.01); *H04W 56/0015* (2013.01); *H04W 76/30* (2018.02);
(Continued)

(58) Field of Classification Search
CPC ............. H04W 72/1263; H04W 76/30; H04W 56/0015; H04W 74/0838; H04W 74/0836; H04W 74/0833
See application file for complete search history.

(56) References Cited

U.S. PATENT DOCUMENTS 12,395,292 B2 * 8/2025 Tsai ...................... H04L 5/0094
2022/0022247 A1 1/2022 Agiwal et al.
(Continued)

OTHER PUBLICATIONS

Samsung; CG-SDT-TAT expiry handing during the CG-SDT procedure; 3GPP TSG-RAN2 Meeting #117 Electronic; R2-2202342; Feb. 21-Mar. 3, 2022; Feb. 14, 2022.
(Continued)

*Primary Examiner* — Asad M Nawaz
*Assistant Examiner* — Michael Wayne Maddox
(74) *Attorney, Agent, or Firm* — Jefferson IP Law, LLP

(57) ABSTRACT

The disclosure relates to a 5G or 6G communication system for supporting a higher data transmission rate. A method performed by a terminal in a wireless communication system is provided. The method includes receiving a radio resource control (RRC) release message including suspend configuration information and configured grant-small data transmission (CG-SDT) configuration information, starting a timer related to a time alignment (TA) for CG-SDT based on the CG-SDT configuration information, identifying that criteria for a small data transmission (SDT) procedure is met, and in case that any configured grant (CG) occasion corresponding to a synchronization signal block (SSB) with a reference signal received strength (RSRP) above a threshold value is not available while the timer related to the TA for CG-SDT is running, and criteria for a random access-small data transmission (RA-SDT) procedure is met, performing the RA-SDT procedure.

16 Claims, 10 Drawing Sheets

(51) Int. Cl.
     H04W 74/0833          (2024.01)
     H04W 74/0836          (2024.01)
     H04W 74/0838          (2024.01)
     H04W 76/30            (2018.01)

(52) U.S. Cl.
     CPC .... *H04W 74/0833* (2013.01); *H04W 74/0836*
          (2024.01); *H04W 74/0838* (2024.01)

(56) References Cited

U.S. PATENT DOCUMENTS

| | | | |
|---|---|---|---|
| 2022/0078697 A1 | 3/2022 | Tseng et al. | |
| 2023/0007701 A1* | 1/2023 | Laselva | H04W 36/0033 |
| 2023/0022523 A1* | 1/2023 | He | H04B 17/328 |
| 2023/0040421 A1* | 2/2023 | Tsai | H04W 72/115 |
| 2023/0379126 A1* | 11/2023 | Liu | H04W 72/21 |
| 2024/0040626 A1* | 2/2024 | Tseng | H04W 72/542 |
| 2024/0244703 A1* | 7/2024 | Tseng | H04B 17/328 |
| 2024/0357698 A1* | 10/2024 | Mao | H04W 4/20 |
| 2025/0031199 A1* | 1/2025 | Park | H04W 72/115 |
| 2025/0048485 A1* | 2/2025 | Lei | H04W 76/27 |
| 2025/0358867 A1* | 11/2025 | Lee | H04W 74/0841 |

OTHER PUBLICATIONS

Zte Corporation et al.; Summary for WI: NR small data transmissions in INACTIVE state (Rel-17); 3GPP TSG RAN Meeting #95; RP-220154; eMeeting; Mar. 17-23, 2022; Mar. 11, 2022.

Nokia et al. Introduction of SDT; 3GPP TSG-RAN WG2 Meeting #117 Electronic; R2-2204234; Elbonia; Feb. 21-Mar. 3, 2022; Mar. 12, 2022.

International Search Report with Written Opinion dated Jun. 8, 2023; International Appln. No. PCT/KR2023/004114.

* cited by examiner

FIG. 7

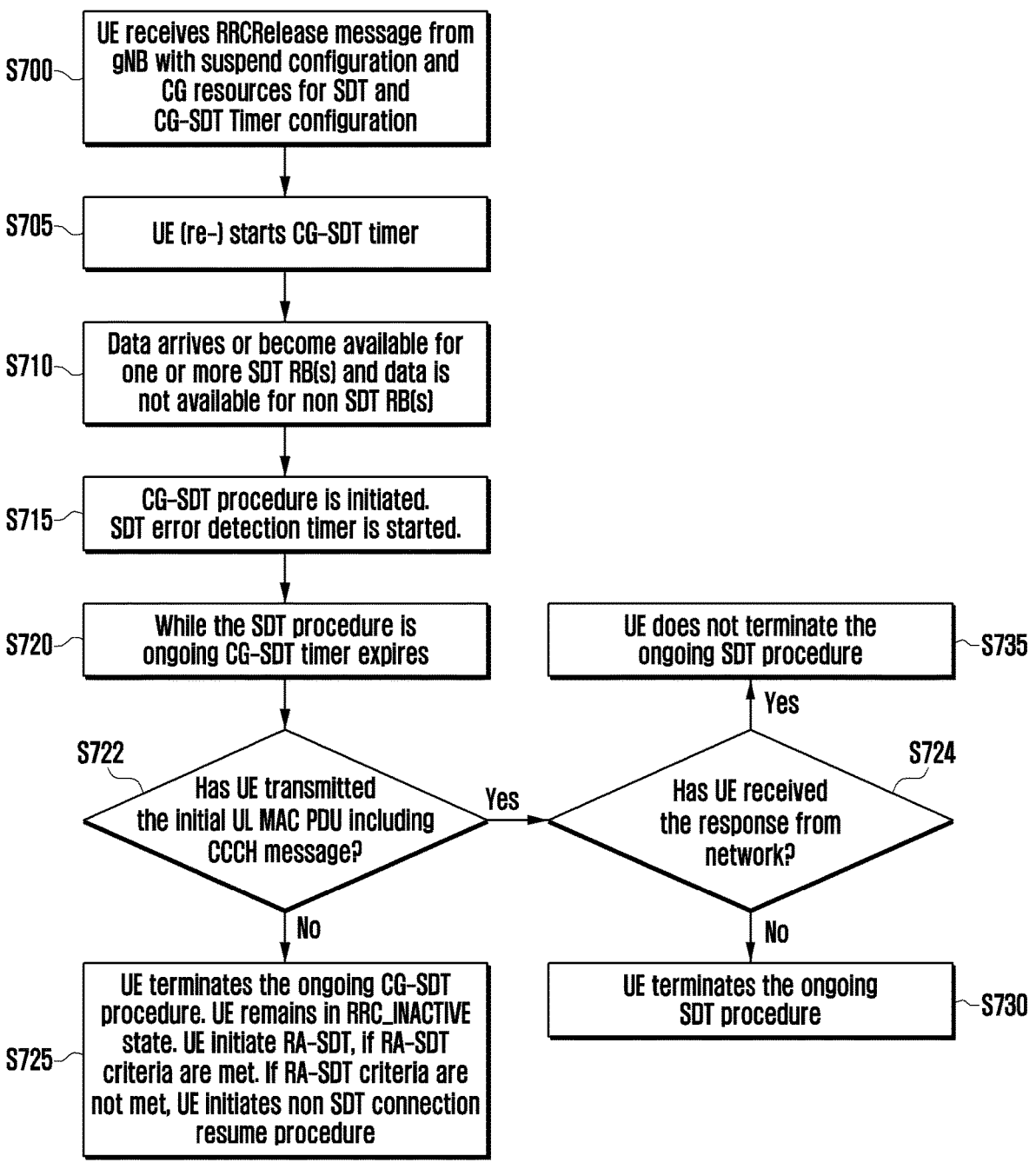

S700 — UE receives RRCRelease message from gNB with suspend configuration and CG resources for SDT and CG-SDT Timer configuration S705 — UE (re-) starts CG-SDT timer S710 — Data arrives or become available for one or more SDT RB(s) and data is not available for non SDT RB(s)

S715 — CG-SDT procedure is initiated. SDT error detection timer is started.

S720 — While the SDT procedure is ongoing CG-SDT timer expires

S735 — UE does not terminate the ongoing SDT procedure

S722 — Has UE transmitted the initial UL MAC PDU including CCCH message?

Yes

S724 — Has UE received the response from network?

Yes

No

S725 — UE terminates the ongoing CG-SDT procedure. UE remains in RRC_INACTIVE state. UE initiate RA-SDT, if RA-SDT criteria are met. If RA-SDT criteria are not met, UE initiates non SDT connection resume procedure No S730 — UE terminates the ongoing SDT procedure

FIG. 8

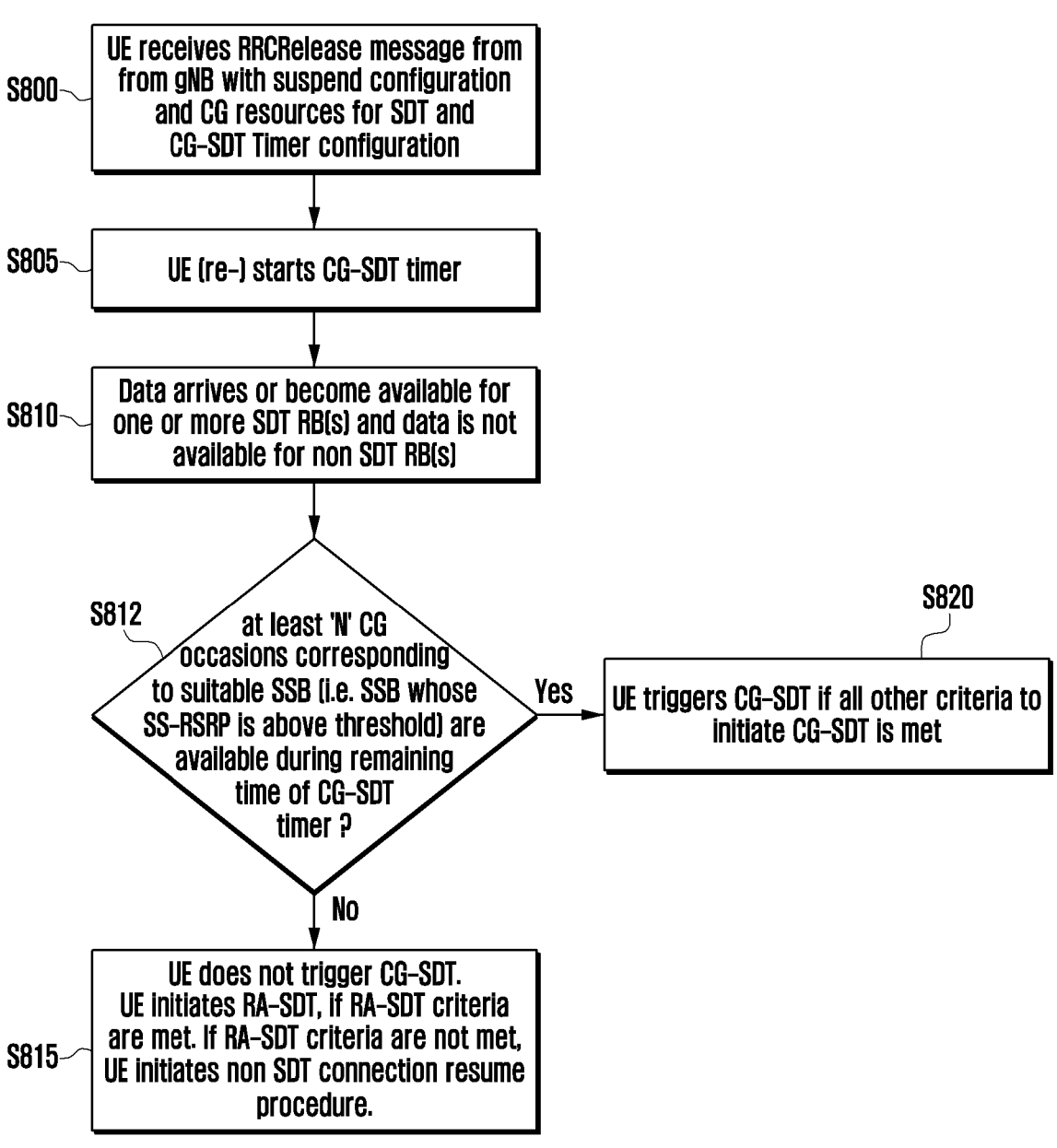

S800 — UE receives RRCRelease message from from gNB with suspend configuration and CG resources for SDT and CG-SDT Timer configuration S805 — UE (re-) starts CG-SDT timer S810 — Data arrives or become available for one or more SDT RB(s) and data is not available for non SDT RB(s)

S812 — at least 'N' CG occasions corresponding to suitable SSB (i.e. SSB whose SS-RSRP is above threshold) are available during remaining time of CG-SDT timer ?

Yes

S820 — UE triggers CG-SDT if all other criteria to initiate CG-SDT is met

No

S815 — UE does not trigger CG-SDT. UE initiates RA-SDT, if RA-SDT criteria are met. If RA-SDT criteria are not met, UE initiates non SDT connection resume procedure.

METHOD AND APPARATUS FOR DATA TRANSMISSION IN RRC INACTIVE

CROSS-REFERENCE TO RELATED APPLICATION(S)

This application is based on and claims priority under 35 U.S.C. § 119 (a) of a Korean patent application number 10-2022-0039154, filed on Mar. 29, 2022, in the Korean Intellectual Property Office, the disclosure of which is incorporated by reference herein in its entirety.

BACKGROUND

1. Field

The disclosure relates to a wireless communication system. More particularly, the disclosure relates to an apparatus, a method and a system for data transmission in RRC_INACTIVE.

2. Description of Related Art 5G mobile communication technologies define broad frequency bands such that high transmission rates and new services are possible, and can be implemented not only in "Sub 6 GHz" bands such as 3.5 GHZ, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broad-bands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and a system for data transmission in RRC_INACTIVE.

Additional aspects will be set forth in part in the description which follows and, in part, will be apparent from the description, or may be learned by practice of the presented embodiments.

In accordance with an aspect of the disclosure, a method performed by a terminal in a wireless communication system is provided. The method includes receiving a radio resource control (RRC) release message including suspend configuration information and configured grant-small data transmission (CG-SDT) configuration information, starting a timer related to a time alignment (TA) for CG-SDT based on the CG-SDT configuration information, identifying that criteria for a small data transmission (SDT) procedure is met, and in case that any configured grant (CG) occasion corresponding to a synchronization signal block (SSB) with a reference signal received strength (RSRP) above a threshold value is not available while the timer related to the TA for CG-SDT is running, and criteria for a random access-small data transmission (RA-SDT) procedure is met, performing the RA-SDT procedure.

In accordance with another aspect of the disclosure, a terminal in a wireless communication system is provided. The terminal includes a transceiver and a controller. The controller is configured to receive, via the transceiver, an RRC release message including suspend configuration information and CG-SDT configuration information, start a timer related to a TA for CG-SDT based on the CG-SDT configuration information, identify that criteria for an SDT procedure is met, and in case that any CG occasion corresponding to an SSB with an RSRP above a threshold value is not available while the timer related to the TA for CG-SDT is running, and criteria for an RA-SDT procedure is met, perform the RA-SDT procedure.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Figure 9:
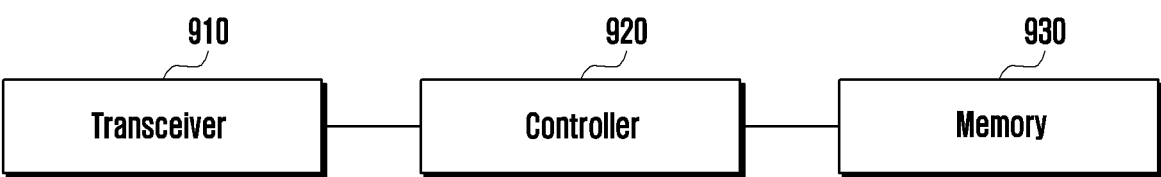
Figure 10:
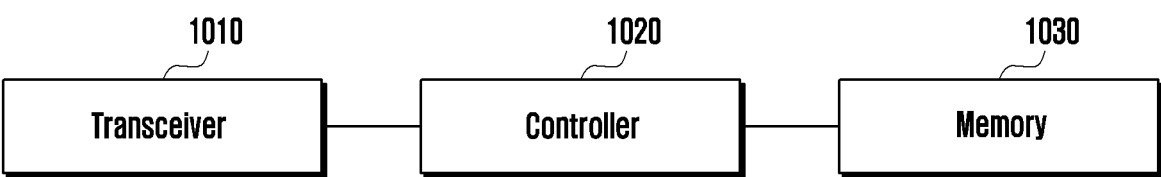

4 resume request using a suitable SSB according to an embodiment of the disclosure;

FIG. 7 illustrates an operation of a UE according to an embodiment of the disclosure;

FIG. 8 illustrates an operation of a UE according to an embodiment of the disclosure;

FIG. 9 is a block diagram of a terminal according to an embodiment of the disclosure; and FIG. 10 is a block diagram of a base station according to an embodiment of the disclosure.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is known to those skilled in the art that blocks of a flowchart (or sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart. Because the computer program instructions may be stored in a non-transitory computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out operations of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit", "module" or the like may refer to a software component or hardware component, such as, for example, a field-programmable gate array (FPGA) or an application-specific integrated circuit (ASIC) capable of carrying out a function or an operation. However, a "unit", or the like, is not limited to hardware or software. A unit, or the like, may be configured so as to reside in an addressable storage medium or to drive one or more processors. Units, or the like, may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

Prior to the detailed description, terms or definitions necessary to understand the disclosure are described. However, these terms should be construed in a non-limiting way.

The "base station (BS)" is an entity communicating with a user equipment (UE) and may be referred to as BS, base transceiver station (BTS), node B (NB), evolved NB (eNB), access point (AP), 5G NB (5GNB), or next generation node B (gNB).

The "UE" is an entity communicating with a BS and may be referred to as UE, device, mobile station (MS), mobile equipment (ME), or terminal.

In the recent years several broadband wireless technologies have been developed to meet the growing number of broadband subscribers and to provide more and better applications and services. The second generation wireless communication system has been developed to provide voice services while ensuring the mobility of users. Third generation wireless communication system supports not only the voice service but also data service. In recent years, the fourth wireless communication system has been developed to provide high-speed data service. However, currently, the fourth generation wireless communication system suffers from lack of resources to meet the growing demand for high speed data services. So fifth generation wireless communication system (also referred as next generation radio or NR) is being developed to meet the growing demand for high speed data services, support ultra-reliability and low latency applications.

The fifth generation wireless communication system supports not only lower frequency bands but also in higher frequency (mmWave) bands, e.g., 10 GHz to 100 GHz bands, so as to accomplish higher data rates. To mitigate propagation loss of the radio waves and increase the transmission distance, the beamforming, massive Multiple-Input Multiple-Output (MIMO), Full Dimensional MIMO (FD-MIMO), array antenna, an analog beam forming, large scale antenna techniques are being considered in the design of fifth generation wireless communication system. In addition, the fifth generation wireless communication system is expected to address different use cases having quite different requirements in terms of data rate, latency, reliability, mobility etc. However, it is expected that the design of the air-interface of the fifth generation wireless communication system would be flexible enough to serve the UEs having quite different capabilities depending on the use case and market segment the UE cater service to the end customer. Few example use cases the fifth generation wireless communication system wireless system is expected to address is enhanced Mobile Broadband (eMBB), massive Machine Type Communication (m-MTC), ultra-reliable low latency communication (URLL) etc. The eMBB requirements like tens of Gbps data rate, low latency, high mobility so on and so forth address the market segment representing the conventional wireless broadband subscribers needing internet connectivity everywhere, all the time and on the go. The m-MTC requirements like very high connection density, infrequent data transmission, very long battery life, low mobility address so on and so forth address the market segment representing the Internet of Things (IoT)/Internet of Everything (IoE) envisioning connectivity of billions of devices. The URLL requirements like very low latency, very high reliability and variable mobility so on and so forth address the market segment representing the Industrial automation application, vehicle-to-vehicle/vehicle-to-infrastructure communication foreseen as one of the enabler for autonomous cars.

In the fifth generation wireless communication system operating in higher frequency (mmWave) bands, UE and gNB communicates with each other using Beamforming. Beamforming techniques are used to mitigate the propagation path losses and to increase the propagation distance for communication at higher frequency band. Beamforming enhances the transmission and reception performance using a high-gain antenna. Beamforming can be classified into Transmission (TX) beamforming performed in a transmitting end and reception (RX) beamforming performed in a receiving end. In general, the TX beamforming increases directivity by allowing an area in which propagation reaches to be densely located in a specific direction by using a plurality of antennas. In this situation, aggregation of the plurality of antennas can be referred to as an antenna array, and each antenna included in the array can be referred to as an array element. The antenna array can be configured in various forms such as a linear array, a planar array, etc. The use of the TX beamforming results in the increase in the directivity of a signal, thereby increasing a propagation distance. Further, since the signal is almost not transmitted in a direction other than a directivity direction, a signal interference acting on another receiving end is significantly decreased. The receiving end can perform beamforming on a RX signal by using a RX antenna array. The RX beamforming increases the RX signal strength transmitted in a specific direction by allowing propagation to be concentrated in a specific direction, and excludes a signal transmitted in a direction other than the specific direction from the RX signal, thereby providing an effect of blocking an interference signal. By using beamforming technique, a transmitter can make plurality of transmit beam patterns of different directions. Each of these transmit beam patterns can be also referred as transmit (TX) beam. Wireless communication system operating at high frequency uses plurality of narrow TX beams to transmit signals in the cell as each narrow TX beam provides coverage to a part of cell. The narrower the TX beam, higher is the antenna gain and hence the larger the propagation distance of signal transmitted using beamforming. A receiver can also make plurality of receive (RX) beam patterns of different directions. Each of these receive patterns can be also referred as receive (RX) beam.

Carrier aggregation (CA)/Multi-connectivity in fifth generation wireless communication system: The fifth generation wireless communication system, supports standalone mode of operation as well dual connectivity (DC). In DC a multiple Rx/Tx UE may be configured to utilize resources provided by two different nodes (or NBs) connected via non-ideal backhaul. One node acts as the Master Node (MN) and the other as the Secondary Node (SN). The MN and SN are connected via a network interface and at least the MN is connected to the core network. NR also supports Multi-RAT Dual Connectivity (MR-DC) operation whereby a UE in RRC_CONNECTED is configured to utilize radio resources provided by two distinct schedulers, located in two different nodes connected via a non-ideal backhaul and providing either evolved-universal terrestrial radio access (E-UTRA) (i.e. if the node is an ng-eNB) or NR access (i.e. if the node is a gNB). In NR for a UE in RRC_CONNECTED not configured with CA/DC there is only one serving cell comprising of the primary cell (PCell). For a UE in RRC_CONNECTED configured with CA/DC the term 'serving cells' is used to denote the set of cells comprising of the Special Cell(s) and all secondary cells. In NR the term Master Cell Group (MCG) refers to a group of serving cells associated with the Master Node, comprising of the PCell and optionally one or more secondary cells (SCells). In NR the term Secondary Cell Group (SCG) refers to a group of serving cells associated with the Secondary Node, comprising of the Primary SCG Cell (PSCell) and optionally one or more SCells. In NR primary cell (PCell) refers to a serving cell in MCG, operating on the primary frequency, in which the UE either performs the initial connection establishment procedure or initiates the connection re-establishment procedure. In NR for a UE configured with CA, Scell is a cell providing additional radio resources on top of Special Cell. Primary SCG Cell (PSCell) refers to a serving cell in SCG in which the UE performs random access when performing the Reconfiguration with Sync procedure. For Dual Connectivity operation the term Special Cell (SpCell) refers to the PCell of the MCG or the PSCell of the SCG, otherwise the term Special Cell refers to the PCell.

System information acquisition in fifth generation wireless communication system: In the fifth generation wireless communication system, node B (gNB) or base station in cell broadcast Synchronization Signal and physical broadcast channel (PBCH) block (SSB) consists of primary and secondary synchronization signals (PSS, SSS) and system information. System information includes common parameters needed to communicate in cell. In the fifth generation wireless communication system (also referred as next generation radio or NR), System Information (SI) is divided into the master information block (MIB) and a number of system information blocks (SIBs) where:

*the MIB is always transmitted on the BCH with a periodicity of 80 ms and repetitions made within 80 ms and it includes parameters that are needed to acquire SIB 1 from the cell.

*the SIB1 is transmitted on the downlink shared channel (DL-SCH) with a periodicity of 160 ms and variable transmission repetition. The default transmission repetition periodicity of SIB1 is 20 ms but the actual transmission repetition periodicity is up to network implementation. The scheduling information in SIB 1 includes mapping between SIBs and SI messages, periodicity of each SI message and SI window length.

The scheduling information in SIB 1 includes an indicator for each SI message, which indicates whether the concerned SI message is being broadcasted or not. If at least one SI message is not being broadcasted, SIB1 may include random access resources (physical random access channel (PRACH) preamble(s) and PRACH resource(s)) for requesting gNB to broadcast one or more SI message(s).

*SIBs other than SIB1 are carried in System Information (SI) messages, which are transmitted on the DL-SCH. Only SIBs having the same periodicity can be mapped to the same SI message. Each SI message is transmitted within periodically occurring time domain windows (referred to as SI-windows with same length for all SI messages). Each SI message is associated with a SI-window and the SI-windows of different SI messages do not overlap. That is, within one SI-window only the corresponding SI message is transmitted. Any SIB except SIB1 can be configured to be cell specific or area specific, using an indication in SIB1. The cell specific SIB is applicable only within a cell that provides the SIB while the area specific SIB is applicable within an area referred to as SI area, which consists of one or several cells and is identified by systemInformation-AreaID.

Physical Downlink Control Channel (PDCCH) in fifth generation wireless communication system: In the fifth generation wireless communication system, Physical Downlink Control Channel (PDCCH) is used to schedule DL transmissions on PDSCH and UL transmissions on PUSCH, where the Downlink Control Information (DCI) on PDCCH includes: Downlink assignments containing at least modulation and coding format, resource allocation, and HARQ information related to DL-SCH; Uplink scheduling grants containing at least modulation and coding format, resource allocation, and HARQ information related to UL-SCH. In addition to scheduling, PDCCH can be used to for: Activation and deactivation of configured PUSCH transmission with configured grant; Activation and deactivation of PDSCH semi-persistent transmission; Notifying one or more UEs of the slot format; Notifying one or more UEs of the PRB(s) and OFDM symbol(s) where the UE may assume no transmission is intended for the UE; Transmission of TPC commands for PUCCH and PUSCH; Transmission of one or more TPC commands for SRS transmissions by one or more UEs; Switching a UE's active bandwidth part; Initiating a random access procedure. A UE monitors a set of PDCCH candidates in the configured monitoring occasions in one or more configured Control REsource SETs (CORESETs) according to the corresponding search space configurations. A CORESET consists of a set of PRBs with a time duration of 1 to 3 OFDM symbols. The resource units Resource Element Groups (REGs) and Control Channel Elements (CCEs) are defined within a CORESET with each CCE consisting a set of REGs. Control channels are formed by aggregation of CCE. Different code rates for the control channels are realized by aggregating different number of CCE. Interleaved and non-interleaved CCE-to-REG mapping are supported in a CORESET. Polar coding is used for PDCCH. Each resource element group carrying PDCCH carries its own DMRS. Quadrature phase shift keying (QPSK) modulation is used for PDCCH.

In fifth generation wireless communication system, a list of search space configurations are signaled by gNB for each configured BWP wherein each search configuration is uniquely identified by an identifier. Identifier of search space configuration to be used for specific purpose such as paging reception, SI reception, random access response reception is explicitly signaled by gNB. In NR search space configuration comprises of parameters Monitoring-periodicity-PDCCH-slot, Monitoring-offset-PDCCH-slot, Monitoring-symbols-PDCCH-within-slot and duration. A UE determines PDCCH monitoring occasion(s) within a slot using the parameters PDCCH monitoring periodicity (Monitoring-periodicity-PDCCH-slot), the PDCCH monitoring offset (Monitoring-offset-PDCCH-slot), and the PDCCH monitoring pattern (Monitoring-symbols-PDCCH-within-slot). PDCCH monitoring occasions are there in slots 'x' to x+duration where the slot with number 'x' in a radio frame with number 'y' satisfies the Equation 1 below:

$$(y*(\text{number of slots in a radio frame})+x-\text{Monitoring-offset-PDCCH-slot})\bmod (\text{Monitoring-periodicity-PDCCH-slot})=0; \quad \text{Equation 1}$$

The starting symbol of a PDCCH monitoring occasion in each slot having PDCCH monitoring occasion is given by Monitoring-symbols-PDCCH-within-slot. The length (in symbols) of a PDCCH monitoring occasion is given in the corset associated with the search space. Search space configuration includes the identifier of coreset configuration associated with it. A list of coreset configurations are signaled by gNB for each configured BWP wherein each coreset configuration is uniquely identified by an identifier. Note that each radio frame is of 10 ms duration. Radio frame is identified by a radio frame number or system frame number. Each radio frame comprises of several slots wherein the number of slots in a radio frame and duration of slots depends on sub carrier spacing. The number of slots in a radio frame and duration of slots depends radio frame for each supported SCS is pre-defined in NR. Each coreset configuration is associated with a list of Transmission configuration indicator (TCI) states. One DL RS ID (SSB or channel state information reference signal (CSI RS)) is configured per TCI state. The list of TCI states corresponding to a coreset configuration is signaled by gNB via RRC signaling. One of the TCI state in TCI state list is activated and indicated to UE by gNB. TCI state indicates the DL TX beam (DL TX beam is QCLed with SSB/CSI RS of TCI state) used by gNB for transmission of PDCCH in the PDCCH monitoring occasions of a search space.

BWP operation in fifth generation wireless communication system: In fifth generation wireless communication system bandwidth adaptation (BA) is supported. With BA, the receive and transmit bandwidth of a UE need not be as large as the bandwidth of the cell and can be adjusted: the width can be ordered to change (e.g. to shrink during period of low activity to save power); the location can move in the frequency domain (e.g. to increase scheduling flexibility); and the subcarrier spacing can be ordered to change (e.g. to allow different services). A subset of the total cell bandwidth of a cell is referred to as a Bandwidth Part (BWP). BA is achieved by configuring RRC connected UE with BWP(s) and telling the UE which of the configured BWPs is currently the active one. When BA is configured, the UE only has to monitor PDCCH on the one active BWP i.e. it does not have to monitor PDCCH on the entire DL frequency of the serving cell. In RRC connected state, UE is configured with one or more DL and UL BWPs, for each configured Serving Cell (i.e. PCell or SCell). For an activated Serving Cell, there is always one active UL and DL BWP at any point in time. The BWP switching for a Serving Cell is used to activate an inactive BWP and deactivate an active BWP at a time. The BWP switching is controlled by the PDCCH indicating a downlink assignment or an uplink grant, by the bwp-InactivityTimer, by RRC signaling, or by the MAC entity itself upon initiation of Random Access procedure. Upon addition of SpCell or activation of an SCell, the DL BWP and UL BWP indicated by firstActiveDownlinkBWP-Id and firstActiveUplinkBWP-Id respectively is active without receiving PDCCH indicating a downlink assignment or an uplink grant. The active BWP for a Serving Cell is indicated by either RRC or PDCCH. For unpaired spectrum, a DL BWP is paired with a UL BWP, and BWP switching is common for both UL and DL. Upon expiry of BWP inactivity timer UE switch to the active DL BWP to the default DL BWP or initial DL BWP (if default DL BWP is not configured).

Random access in fifth generation wireless communication system: In the 5G wireless communication system, random access (RA) is supported. Random access (RA) is used to achieve uplink (UL) time synchronization. RA is used during initial access, handover, radio resource control (RRC) connection re-establishment procedure, scheduling request transmission, secondary cell group (SCG) addition/modification, beam failure recovery and data or control information transmission in UL by non-synchronized UE in RRC CONNECTED state. Several types of random access procedure is supported.

Contention based random access (CBRA): This is also referred as 4 step CBRA. In this type of random access, UE first transmits Random Access preamble (also referred as Msg1) and then waits for Random access response (RAR) in the RAR window. RAR is also referred as Msg2. Next generation node B (gNB) transmits the RAR on physical downlink shared channel (PDSCH). PDCCH scheduling the PDSCH carrying RAR is addressed to RA-radio network temporary identifier (RA-RNTI). RA-RNTI identifies the time-frequency resource (also referred as physical RA channel (PRACH) occasion or PRACH transmission (TX) occasion or RA channel (RACH) occasion) in which RA preamble was detected by gNB. The RA-RNTI is calculated as follows: RA-RNTI=1+s_id+14*t_id+14*80*f_id+14*80*8*ul_carrier_id, where s_id is the index of the first orthogonal frequency division multiplexing (OFDM) symbol of the PRACH occasion where UE has transmitted Msg1, i.e. RA preamble; $0 \leq s\_id < 14$; t_id is the index of the first slot of the PRACH occasion ($0 \leq t\_id < 80$); f_id is the index of the PRACH occasion within the slot in the frequency domain ($0 \leq f\_id < 8$), and ul_carrier_id is the UL carrier used for Msg1 transmission (0 for normal UL (NUL) carrier and 1 for supplementary UL (SUL) carrier. Several RARs for various Random access preambles detected by gNB can be multiplexed in the same RAR media access control (MAC) protocol data unit (PDU) by gNB. An RAR in MAC PDU corresponds to UE's RA preamble transmission if the RAR includes an RA preamble identifier (RAPID) of RA preamble transmitted by the UE. If the RAR corresponding to its RA preamble transmission is not received during the RAR window and UE has not yet transmitted the RA preamble for a configurable (configured by gNB in RACH configuration) number of times, the UE goes back to first step i.e. select random access resource (preamble/RACH occasion) and transmits the RA preamble. A backoff may be applied before going back to first step.

If the RAR corresponding to its RA preamble transmission is received the UE transmits message 3 (Msg3) in UL grant received in RAR. Msg3 includes message such as RRC connection request, RRC connection re-establishment request, RRC handover confirm, scheduling request, SI request etc. It may include the UE identity (i.e. cell-radio network temporary identifier (C-RNTI) or system architecture evolution (SAE)-temporary mobile subscriber identity (S-TMSI) or a random number). After transmitting the Msg3, UE starts a contention resolution timer. While the contention resolution timer is running, if UE receives a physical downlink control channel (PDCCH) addressed to C-RNTI included in Msg3, contention resolution is considered successful, contention resolution timer is stopped and RA procedure is completed. While the contention resolution timer is running, if UE receives contention resolution MAC control element (CE) including the UE's contention resolution identity (first X bits of common control channel (CCCH) service data unit (SDU) transmitted in Msg3), contention resolution is considered successful, contention resolution timer is stopped and RA procedure is completed. If the contention resolution timer expires and UE has not yet transmitted the RA preamble for a configurable number of times, UE goes back to first step i.e. select random access resource (preamble/RACH occasion) and transmits the RA preamble. A backoff may be applied before going back to first step.

Contention free random access (CFRA): This is also referred as legacy CFRA or 4 step CFRA. CFRA procedure is used for scenarios such as handover where low latency is required, timing advance establishment for secondary cell (Scell), etc. Evolved node B (eNB) assigns to UE dedicated Random access preamble. UE transmits the dedicated RA preamble. ENB transmits the RAR on PDSCH addressed to RA-RNTI. RAR conveys RA preamble identifier and timing alignment information. RAR may also include UL grant. RAR is transmitted in RAR window similar to contention based RA (CBRA) procedure. CFRA is considered successfully completed after receiving the RAR including RA preamble identifier (RAPID) of RA preamble transmitted by the UE. In case RA is initiated for beam failure recovery, CFRA is considered successfully completed if PDCCH addressed to C-RNTI is received in search space for beam failure recovery. If the RAR window expires and RA is not successfully completed and UE has not yet transmitted the RA preamble for a configurable (configured by gNB in RACH configuration) number of times, the UE retransmits the RA preamble.

For certain events such has handover and beam failure recovery if dedicated preamble(s) are assigned to UE, during first step of random access i.e. during random access resource selection for Msg1 transmission UE determines whether to transmit dedicated preamble or non dedicated preamble. Dedicated preambles is typically provided for a subset of SSBs/CSI RSs. If there is no SSB/CSI RS having DL RSRP above a threshold amongst the SSBs/CSI RSs for which contention free random access resources (i.e. dedicated preambles/random access occasions (ROs)) are provided by gNB, UE selects non dedicated preamble. Otherwise UE selects dedicated preamble. So during the RA procedure, one random access attempt can be CFRA while other random access attempt can be CBRA.

2 step contention based random access (2 step CBRA): In the first step, UE transmits random access preamble on PRACH and a payload (i.e. MAC PDU) on PUSCH. The random access preamble and payload transmission is also referred as MsgA. In the second step, after MsgA transmission, the UE monitors for a response from the network (i.e. gNB) within a configured window. The response is also referred as MsgB. Next generation node B (gNB) transmits the MsgB on physical downlink shared channel (PDSCH). PDCCH scheduling the PDSCH carrying MsgB is addressed to MsgB-radio network temporary identifier (MSGB-RNTI). MSGB-RNTI identifies the time-frequency resource (also referred as physical RA channel (PRACH) occasion or PRACH transmission (TX) occasion or RA channel (RACH) occasion) in which RA preamble was detected by gNB. The MSGB-RNTI is calculated as follows: RA-RNTI=1+s_id+ 14*t_id+14*80*f_id+14*80*8*ul_carrier_id+14×80×8×2, where s_id is the index of the first orthogonal frequency division multiplexing (OFDM) symbol of the PRACH occasion where UE has transmitted Msg1, i.e. RA preamble; $0 \leq s\_id < 14$; t_id is the index of the first slot of the PRACH occasion ($0 \leq t\_id < 80$); f_id is the index of the PRACH occasion within the slot in the frequency domain ($0 \leq f\_id < 8$), and ul_carrier_id is the UL carrier used for Msg1 transmission (0 for normal UL (NUL) carrier and 1 for supplementary UL (SUL) carrier.

If CCCH SDU was transmitted in MsgA payload, UE performs contention resolution using the contention resolution information in MsgB. The contention resolution is successful if the contention resolution identity received in MsgB matches first 48 bits of CCCH SDU transmitted in MsgA. If C-RNTI was transmitted in MsgA payload, the contention resolution is successful if UE receives PDCCH addressed to C-RNTI. If contention resolution is successful, random access procedure is considered successfully completed. Instead of contention resolution information corresponding to the transmitted MsgA, MsgB may include a fallback information corresponding to the random access preamble transmitted in MsgA. If the fallback information is received, UE transmits Msg3 and performs contention resolution using Msg4 as in CBRA procedure. If contention resolution is successful, random access procedure is considered successfully completed. If contention resolution fails upon fallback (i.e. upon transmitting Msg3), UE retransmits MsgA. If configured window in which UE monitors network response after transmitting MsgA expires and UE has not received MsgB including contention resolution information or fallback information as explained above, UE retransmits MsgA. If the random access procedure is not successfully completed even after transmitting the msgA configurable number of times, UE fallbacks to 4 step RACH procedure i.e. UE only transmits the PRACH preamble.

MsgA payload may include one or more of common control channel (CCCH) service data unit (SDU), dedicated control channel (DCCH) SDU, dedicated traffic channel (DTCH) SDU, buffer status report (BSR) MAC control element (CE), power headroom report (PHR) MAC CE, SSB information, C-RNTI MAC CE, or padding. MsgA may include UE ID (e.g. random ID, S-TMSI, C-RNTI, resume ID, etc.) along with preamble in first step. The UE ID may be included in the MAC PDU of the MsgA. UE ID such as C-RNTI may be carried in MAC CE wherein MAC CE is included in MAC PDU. Other UE IDs (such random ID, S-TMSI, C-RNTI, resume ID, etc.) may be carried in CCCH SDU. The UE ID can be one of random ID, S-TMSI, C-RNTI, resume ID, IMSI, idle mode ID, inactive mode ID, etc. The UE ID can be different in different scenarios in which UE performs the RA procedure. When UE performs RA after power on (before it is attached to the network), then UE ID is the random ID. When UE performs RA in IDLE state after it is attached to network, the UE ID is S-TMSI. If UE has an assigned C-RNTI (e.g. in connected state), the UE ID is C-RNTI. In case UE is in INACTIVE state, UE ID is resume ID. In addition to UE ID, some addition ctrl information can be sent in MsgA. The control information may be included in the MAC PDU of the MsgA. The control information may include one or more of connection request indication, connection resume request indication, SI request indication, buffer status indication, beam information (e.g.

one or more DL TX beam ID(s) or SSB ID(s)), beam failure recovery indication/information, data indicator, cell/BS/TRP switching indication, connection re-establishment indication, reconfiguration complete or handover complete message, etc.

2 step contention free random access (2 step CFRA): In this case gNB assigns to UE dedicated Random access preamble(s) and PUSCH resource(s) for MsgA transmission. RO(s) to be used for preamble transmission may also be indicated. In the first step, UE transmits random access preamble on PRACH and a payload on PUSCH using the contention free random access resources (i.e. dedicated preamble/PUSCH resource/RO). In the second step, after MsgA transmission, the UE monitors for a response from the network (i.e. gNB) within a configured window. The response is also referred as MsgB.

Next generation node B (gNB) transmits the MsgB on physical downlink shared channel (PDSCH). PDCCH scheduling the PDSCH carrying MsgB is addressed to MsgB-radio network temporary identifier (MSGB-RNTI). MSGB-RNTI identifies the time-frequency resource (also referred as physical RA channel (PRACH) occasion or PRACH transmission (TX) occasion or RA channel (RACH) occasion) in which RA preamble was detected by gNB. The MSGB-RNTI is calculated as follows: RA-RNTI=1+s_id+14*t_id+14*80*f_id+14*80*8*ul_carrier_id+14×80×8×2, where s_id is the index of the first orthogonal frequency division multiplexing (OFDM) symbol of the PRACH occasion where UE has transmitted Msg1, i.e. RA preamble; OS s_id<14; t_id is the index of the first slot of the PRACH occasion (0≤t_id<80); f_id is the index of the PRACH occasion within the slot in the frequency domain (0≤f_id<8), and ul_carrier_id is the UL carrier used for Msg1 transmission (0 for normal UL (NUL) carrier and 1 for supplementary UL (SUL) carrier.

If UE receives PDCCH addressed to C-RNTI, random access procedure is considered successfully completed. If UE receives fallback information corresponding to its transmitted preamble, random access procedure is considered successfully completed.

For certain events such has handover and beam failure recovery if dedicated preamble(s) and PUSCH resource(s) are assigned to UE, during first step of random access i.e. during random access resource selection for MsgA transmission UE determines whether to transmit dedicated preamble or non dedicated preamble. Dedicated preambles is typically provided for a subset of SSBs/CSI RSs. If there is no SSB/CSI RS having DL RSRP above a threshold amongst the SSBs/CSI RSs for which contention free random access resources (i.e. dedicated preambles/ROs/PUSCH resources) are provided by gNB, UE selects non dedicated preamble. Otherwise UE selects dedicated preamble. So during the RA procedure, one random access attempt can be 2 step CFRA while other random access attempt can be 2 step CBRA.

Upon initiation of random access procedure, UE first selects the carrier (SUL or NUL). If the carrier to use for the Random Access procedure is explicitly signaled by gNB, UE selects the signaled carrier for performing Random Access procedure. If the carrier to use for the Random Access procedure is not explicitly signaled by gNB; and if the Serving Cell for the Random Access procedure is configured with supplementary uplink and if the RSRP of the downlink pathloss reference is less than rsrp-Threshold-SSB-SUL: UE selects the SUL carrier for performing Random Access procedure. Otherwise, UE selects the NUL carrier for performing Random Access procedure. Upon selecting the UL carrier, UE determines the UL and DL BWP for random access procedure as specified in section 5.15 of TS 38.321. UE then determines whether to perform 2 step or 4 step RACH for this random access procedure.

*If this random access procedure is initiated by PDCCH order and if the ra-PreambleIndex explicitly provided by PDCCH is not 0b000000, UE selects 4 step RACH.

*else if 2 step contention free random access resources are signaled by gNB for this random access procedure, UE selects 2 step RACH.

*else if 4 step contention free random access resources are signaled by gNB for this random access procedure, UE selects 4 step RACH.

*else if the UL BWP selected for this random access procedure is configured with only 2 step RACH resources, UE selects 2 step RACH.

*else if the UL BWP selected for this random access procedure is configured with only 4 step RACH resources, UE selects 4 step RACH.

*else if the UL BWP selected for this random access procedure is configured with both 2 step and 4 step RACH resources,

**if RSRP of the downlink pathloss reference is below a configured threshold, UE selects 4 step RACH. Otherwise UE selects 2 step RACH.

In the 5th generation (also referred as NR or New Radio) wireless communication system UE can be in one of the following RRC state: RRC IDLE, RRC INACTIVE and RRC CONNECTED. The RRC states can further be characterized as follows:

In RRC_IDLE state, a UE specific DRX may be configured by upper layers (i.e. NAS). The UE, monitors Short Messages transmitted with P-RNTI over DCI; Monitors a Paging channel for CN paging using 5G-S-TMSI; —Performs neighboring cell measurements and cell (re-)selection; Acquires system information and can send SI request (if configured).

In RRC_INACTIVE state, a UE specific DRX may be configured by upper layers or by RRC layer; In this state, UE stores the UE Inactive AS context. A RAN-based notification area is configured by RRC layer. The UE monitors Short Messages transmitted with P-RNTI over DCI; Monitors a Paging channel for CN paging using 5G-S-TMSI and RAN paging using full I-RNTI; Performs neighboring cell measurements and cell (re-) selection; Performs RAN-based notification area updates periodically and when moving outside the configured RAN-based notification area; Acquires system information and can send SI request (if configured).

In the RRC_CONNECTED, the UE stores the AS context. Unicast data is transmitted/received to/from UE. At lower layers, the UE may be configured with a UE specific DRX. The UE monitors Short Messages transmitted with P-RNTI over DCI, if configured; monitors control channels associated with the shared data channel to determine if data is scheduled for it; provides channel quality and feedback information; performs neighboring cell measurements and measurement reporting; acquires system information.

The 5G or Next Generation Radio Access Network (NG-RAN) based on NR consists of NG-RAN nodes where NG-RAN node is a gNB, providing NR user plane and control plane protocol terminations towards the UE. The gNBs are also connected by means of the NG interfaces to the 5GC, more specifically to the AMF (Access and Mobility Management Function) by means of the NG-C interface and to the UPF (User Plane Function) by means of the NG-U interface. In the 5th generation (also referred as NR or New Radio) wireless communication system, the UE may use Discontinuous Reception (DRX) in RRC_IDLE and RRC_I-NACTIVE state in order to reduce power consumption. In the RRC_IDLE/RRC_INACTIVE state UE wake ups at regular intervals (i.e. every DRX cycle) for short periods to receive paging, to receive SI update notification and to receive emergency notifications. Paging message is transmitted using physical downlink shared channel (PDSCH). Physical downlink common control channel (PDCCH) is addressed to P-RNTI if there is a paging message in PDSCH. P-RNTI is common for all or a group of UE(s). UE identity (i.e. S-TMSI for RRC_IDLE UE or I-RNTI for RRC_INACTIVE UE) is included in paging message to indicate paging for a specific UE. Paging message may include multiple UE identities to page multiple UEs. Paging message is broadcasted (i.e. PDCCH is masked with P-RNTI) over data channel (i.e. PDSCH). SI update and emergency notifications are included in DCI and PDCCH carrying this DCI is addressed to P-RNTI. In the RRC idle/inactive mode UE monitors one paging occasion (PO) every DRX cycle. In the RRC idle/inactive mode UE monitors PO in initial DL BWP. In RRC connected state UE monitors one or more Pos to receive SI update notification and to receive emergency notifications. In RRC connected state, UE can monitor any PO in paging DRX cycle and monitors at least one PO in SI modification period. In the RRC idle/inactive mode UE monitors PO every DRX cycle in its active DL BWP. A PO is a set of 'S' PDCCH monitoring occasions for paging, where 'S' is the number of transmitted SSBs (i.e. the Synchronization Signal and PBCH block (SSB) consists of primary and secondary synchronization signals (PSS, SSS) and PBCH) in cell. UE first determines the paging frame (PF) and then determines the PO with respect to the determined PF. One PF is a radio frame (10 ms).

Small data transmission in fifth generation wireless communication system: In 5G wireless communication system, small data transmission (SDT) in RRC_INACTIVE is supported. The uplink data can be transmitted in Msg3 in case of 4 step RA procedure and in MsgA in case of 2 step RA procedure.

Figure 1:
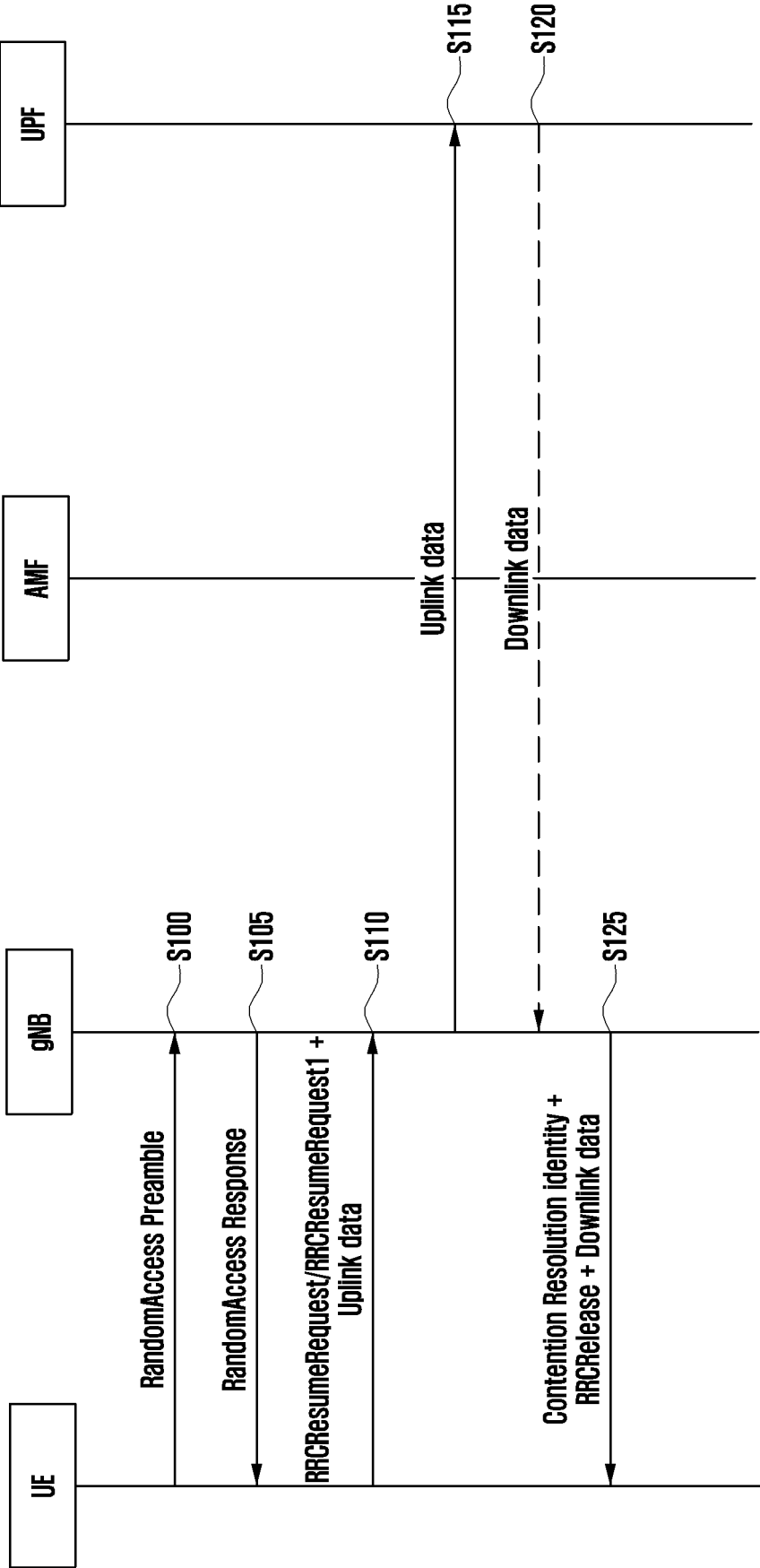
FIG. 1 is an example signaling flow for small data transmission using 4 step random access (RA) according to an embodiment of the disclosure.

FIG. 1 is an example signaling flow for small data transmission using 4 step RA according to an embodiment of the disclosure.

0. Criteria to initiate 4 step RA for SDT is met. UE selects preamble/RO from preambles/ROs for SDT. UE transmits (S100) random access preamble and receives (S105) RAR including UL grant for Msg3 transmission.

1. The UE sends (S110) an RRCResumeRequest/RRCResumeRequest1 to the gNB (same as the last serving gNB) on SRB 0. It includes full/short I-RNTI (resumeIdentity), the resume cause (resumeCause), and an authentication token (resumeMAC-I). The I-RNTI (short or full I-RNTI) is used for context identification and its value may be the same as the I-RNTI that the UE had received from the last serving gNB in the RRCRelease with suspendConfig message. The ResumeMAC-I is a 16-bit message authentication token, the UE may calculate it using the integrity algorithm (NIA or EIA) in the stored AS security context, which was negotiated between the UE and the last serving gNB and the KRRCint from the stored AS security context with the following inputs:

*-KEY: it may be set to current KRRCint;
  *-BEARER: all or at least one of its bits may be set to 1.
  *-DIRECTION: its bit may be set to 1;
  *-COUNT: all or at least one of its bits may be set to 1;

*-MESSAGE: it may be set to VarResumeMAC-Input with following inputs:
  **-source physical cell identity (PCI) (set to the physical cell identity of the PCell the UE was connected to prior to suspension of the RRC connection)
  **-target cell identity (Cell-ID) (Set to the cell-Identity of the first PLMN-Identity included in the PLMN-IdentityInfoList broadcasted in SIB1 of the target cell i.e. the cell to which the UE is sending small data)
  **-source C-RNTI (Set to C-RNTI that the UE had in the PCell it was connected to prior to suspension of the RRC connection).

The UE resumes SRB(s) and DRB(s), derives new security keys using the NextHopChainingCount provided in the RRCRelease message of the previous RRC connection and re-establishes the AS security. The user data are ciphered and integrity protected (Only for DRBs configured with UP integrity protection) and transmitted on DTCH multiplexed with the RRCResumeRequest/RRCResumeRequest1 message on CCCH/CCCH1.

2. gNB validates the resumeMAC-I and delivers (S115) the uplink data to UPF.

3. The gNB sends (S125) the RRCRelease message to keep the UE in RRC_INACTIVE. PDCCH is addressed to TC-RNTI. If downlink data is available, they are sent (S120) ciphered and integrity protected (Only for DRBs configured with UP integrity protection) on DTCH multiplexed with the RRCRelease message on DCCH. gNB may decide not to send the RRCRelease message together with contention Resolution Identity. In this case upon completion of random access, UE monitors PDCCH addressed to C-RNTI. UL/DL data can be exchanged between UE and gNB until RRCRelease message is received or SDT procedure is terminated.

Figure 2:
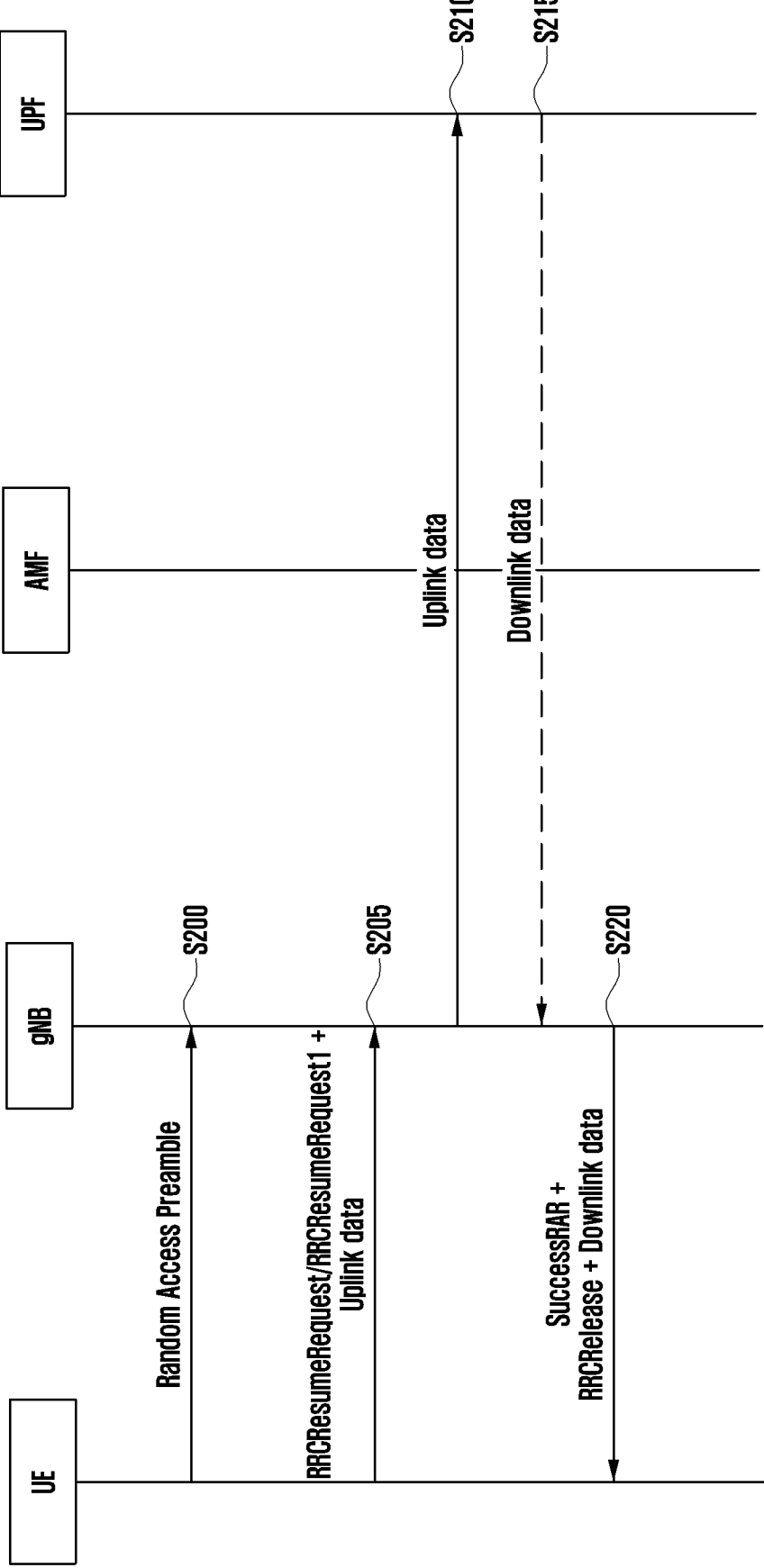
FIG. 2 shows the signaling flow for small data transmission using 2 step RA according to an embodiment of the disclosure.

FIG. 2 shows the signaling flow for small data transmission using 2 step RA according to an embodiment of the disclosure.

0. Criteria to initiate 2 step RA for SDT is met. UE selects preamble/RO/PO from preambles/ROs/POs for SDT. UE (S200) transmits random access preamble.

1. In the MsgA payload, the UE sends (S205) an RRCResumeRequest/RRCResumeRequest1 to the gNB (same as the last serving gNB) on SRB 0. It includes full/short I-RNTI (resumeIdentity), the resume cause (resumeCause), and an authentication token (resumeMAC-I). The I-RNTI (short or full I-RNTI) is used for context identification and its value may be the same as the I-RNTI that the UE had received from the last serving gNB in the RRCRelease with suspendConfig message. The ResumeMAC-I is a 16-bit message authentication token, the UE may calculate it using the integrity algorithm (NIA or EIA) in the stored AS security context, which was negotiated between the UE and the last serving gNB and the KRRCint from the stored AS security context with the following inputs:

*-KEY: it may be set to current KRRCint;
  *-BEARER: all or at least one of its bits may be set to 1.
  *-DIRECTION: its bit may be set to 1;
  *-COUNT: all or at least one of its bits may be set to 1;
  *-MESSAGE: it may be set to VarResumeMAC-Input with following inputs:
  **-source PCI (set to the physical cell identity of the PCell the UE was connected to prior to suspension of the RRC connection)
  **-target Cell-ID (Set to the cellIdentity of the first PLMN-Identity included in the PLMN-IdentityInfoList broadcasted in SIB1 of the target cell i.e. the cell to which the UE is sending small data)

**-source C-RNTI (Set to C-RNTI that the UE had in the PCell it was connected to prior to suspension of the RRC connection).

The UE resumes all or at least one of SRBs and DRBs, derives new security keys using the NextHopChainingCount provided in the RRCRelease message of the previous RRC connection and re-establishes the AS security. The user data are ciphered and integrity protected (Only for DRBs configured with UP integrity protection) and transmitted on DTCH multiplexed with the RRCResumeRequest/RRCResumeRequest1 message on CCCH/CCCH1.

2. gNB validates the resumeMAC-I and delivers (S210) the uplink data to UPF.

3. The gNB sends (S220) the RRCRelease message to keep the UE in RRC_INACTIVE in MsgB along with successRAR. PDCCH is addressed to C-RNTI. If downlink data is available, they are sent (S215) ciphered and integrity protected (Only for DRBs configured with UP integrity protection) on DTCH multiplexed with the RRCRelease message on DCCH. gNB may decide not to send the RRCRelease message together with successRAR. In this case upon completion of random access, UE monitors PDCCH addressed to C-RNTI. UL/DL data can be exchanged between UE and gNB until RRCRelease message is received or SDT procedure is terminated.

Figure 3:
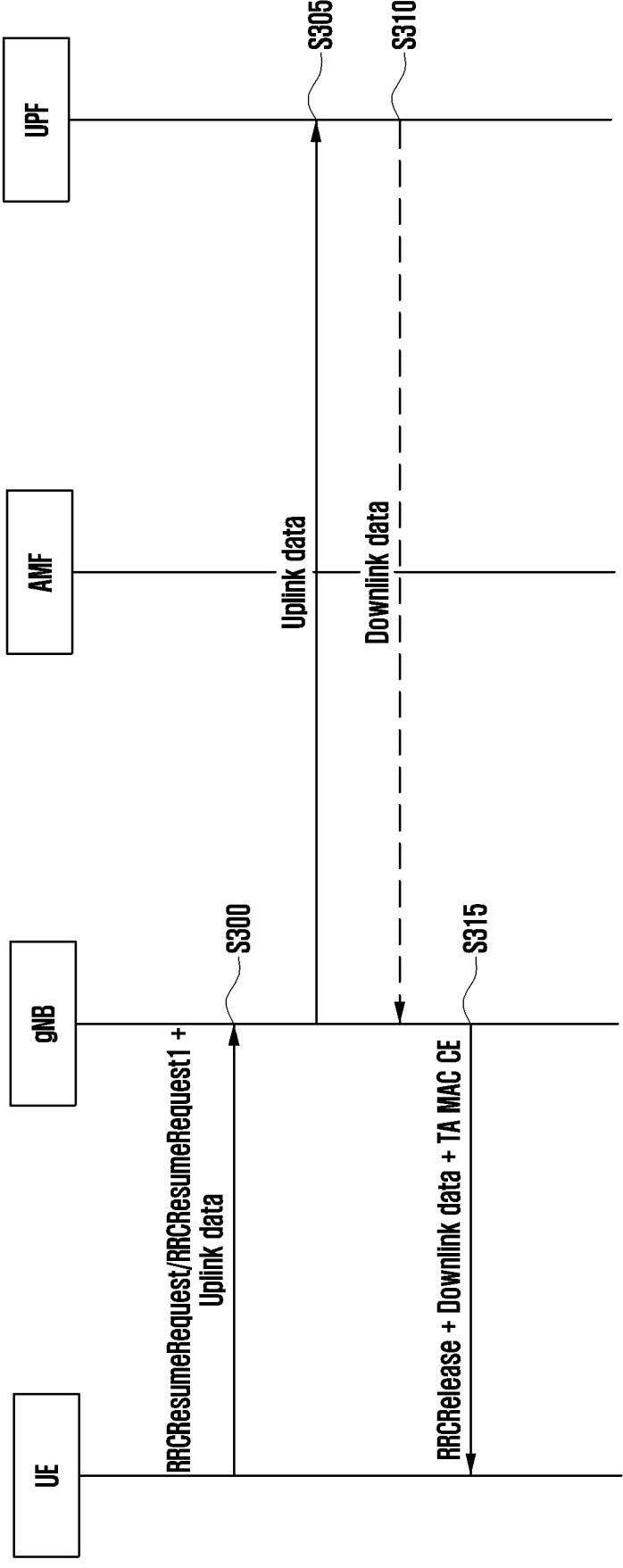
FIG. 3 shows the signaling flow for small data transmission using preconfigured physical uplink data channel (PUSCH) resource (or configured grant-based SDT (CG-SDT)) according to an embodiment of the disclosure.

FIG. 3 shows the signaling flow for small data transmission using preconfigured PUSCH resource (or configured grant-based SDT (CG-SDT)) according to an embodiment of the disclosure.

Criteria to initiate SDT using preconfigured PUSCH resources is met.

In the preconfigured PUSCH resource, the UE sends (S300) an RRCResumeRequest/RRCResumeRequest1 to the gNB (same as the last serving gNB) on SRB 0. It includes full/short I-RNTI (resumeIdentity), the resume cause (resumeCause), and an authentication token (resumeMAC-I). The I-RNTI (short or full I-RNTI) is used for context identification and its value may be the same as the I-RNTI that the UE had received from the last serving gNB in the RRCRelease with suspendConfig message. The ResumeMAC-I is a 16-bit message authentication token, the UE may calculate it using the integrity algorithm (NIA or EIA) in the stored AS security context, which was negotiated between the UE and the last serving gNB and the KRRCint from the stored AS security context with the following inputs:

*-KEY: it may be set to current KRRCint;
*-BEARER: all or at least one of its bits may be set to 1.
*-DIRECTION: its bit may be set to 1;
*-COUNT: all or at least one of its bits may be set to 1;
*-MESSAGE: it may be set to VarResumeMAC-Input with following inputs:
**-source PCI (set to the physical cell identity of the PCell the UE was connected to prior to suspension of the RRC connection)
**-target Cell-ID (Set to the cellIdentity of the first PLMN-Identity included in the PLMN-IdentityInfoList broadcasted in SIB1 of the target cell i.e. the cell to which the UE is sending small data)
**-source C-RNTI (Set to C-RNTI that the UE had in the PCell it was connected to prior to suspension of the RRC connection).

The UE resumes all or at least one of SRBs and DRBs, derives new security keys using the NextHopChainingCount provided in the RRCRelease message of the previous RRC connection and re-establishes the AS security. The user data are ciphered and integrity protected (Only for DRBs configured with UP integrity protection) and transmitted on DTCH multiplexed with the RRCResumeRequest/RRCResumeRequest1 message on CCCH.

*The UE can alternately transmit its small data by using one of the following options:
**RRCResumeRequest (or new RRC message). resumeIdentity, ResumeMAC-I, resumeCause, NAS container in RRCResumeRequest/RRCResumeRequest1. NAS container includes UL data.
**new MAC CE (resumeIdentity, ResumeMAC-I)+ uplink data (on DTCH). resumeIdentity is provided for UE identification purpose. ResumeMAC-I is for security.

2. gNB validates the resumeMAC-I and delivers (S305) the uplink data to UPF.

3. The gNB sends (S315) the RRCRelease message to keep the UE in RRC_INACTIVE. The PDCCH is addressed to C-RNTI. The C-RNTI is the one which the UE used in cell from which it received preconfigured PUSCH resources. Alternately, the C-RNTI can be assigned along with preconfigured PUSCH resources. If downlink data is available, they are sent (S310) ciphered and integrity protected (Only for DRBs configured with UP integrity protection) on DTCH multiplexed with the RRCRelease message on DCCH.

In the response of the small data transmission, UE can receive a signal (RRC message or DCI) for the following purpose: releasing pre-configured PUSCH or switching to Resume procedure (i.e. RRC_CONNECTED).

UE is in RRC Connected. UE receives RRCRelease with suspend config and CG-SDT (configured grant-based SDT) resources. UE enters RRC_INACTIVE state. UE starts CG-SDT-Timer. At some point in RRC_INACTIVE state, SDT criteria (DL RSRP of cell is above RSRP threshold, data available for SDT radio bearers (RBs) is below the data volume threshold, etc.) is met and criteria to indicate CG-SDT is met and UE initiates CG-SDT. UE initiates CG-SDT only if cell is not changed (i.e. UE is in same cell from which UE has last received RRC Release message) and time alignment (TA) is valid (i.e. CG-SDT-Timer is running) and CG resources for SDT are configured and at least one SSB associated with CG resources is above a configured threshold. CG resource occurs periodically at periodicity P configured by network.

Figure 4:
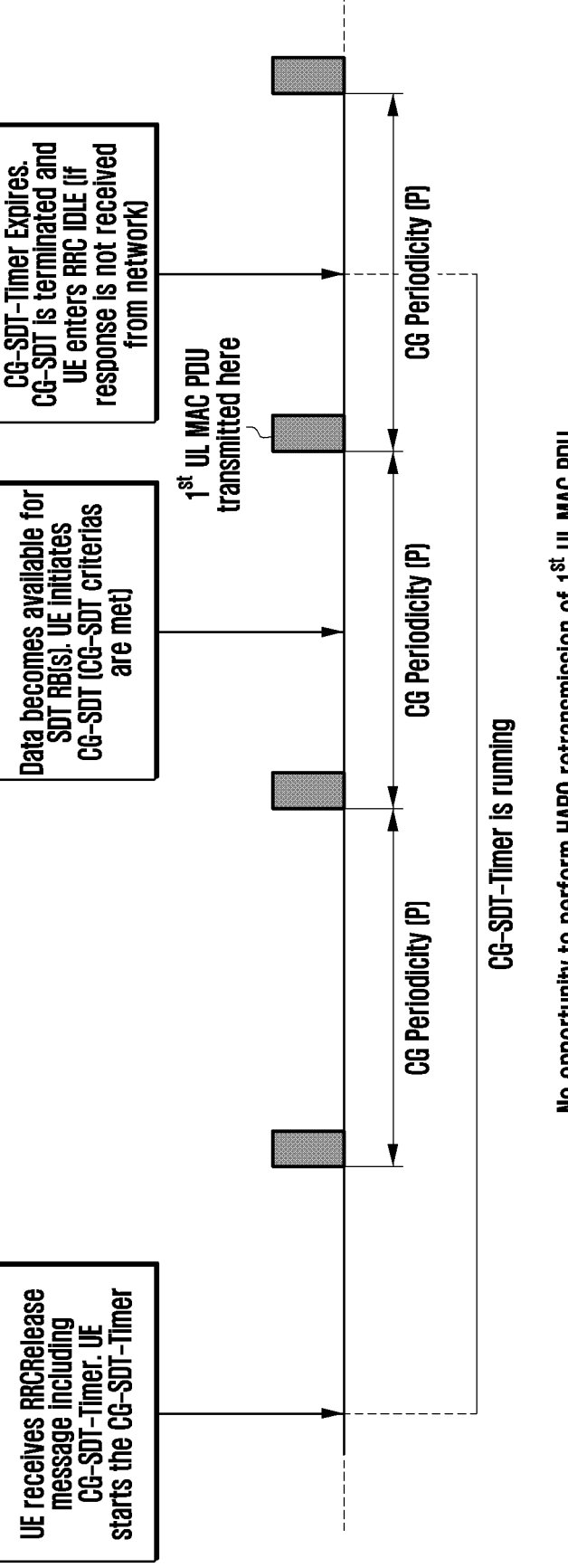
FIG. 4 illustrates a scenario where CG-SDT timer expires after the initial hybrid automatic repeat request (HARQ) transmission of first uplink (UL) medium access control (MAC) protocol data unit (PDU) carrying RRC resume request according to an embodiment of the disclosure.

FIG. 4 illustrates a scenario where CG-SDT timer expires after the initial HARQ transmission of first UL MAC PDU carrying RRC resume request according to an embodiment of the disclosure.

Referring to FIG. 4, CG-SDT timer may expire after the initial HARQ transmission of first UL MAC PDU carrying RRC resume request. As a result, there is no opportunity for UE to perform HARQ retransmission in case the initial HARQ transmission has failed. As per the current procedure, if CG-SDT timer expires during CG-SDT before receiving response from network for the first UL MAC PDU transmission, UE transition to RRC IDLE. So in the scenario of FIG. 4, UE transition to RRC IDLE. This is inefficient and UE would need to initiate connection setup procedure in RRC IDLE to transmit data resulting in increased latency and UE power consumption.

Figure 5:
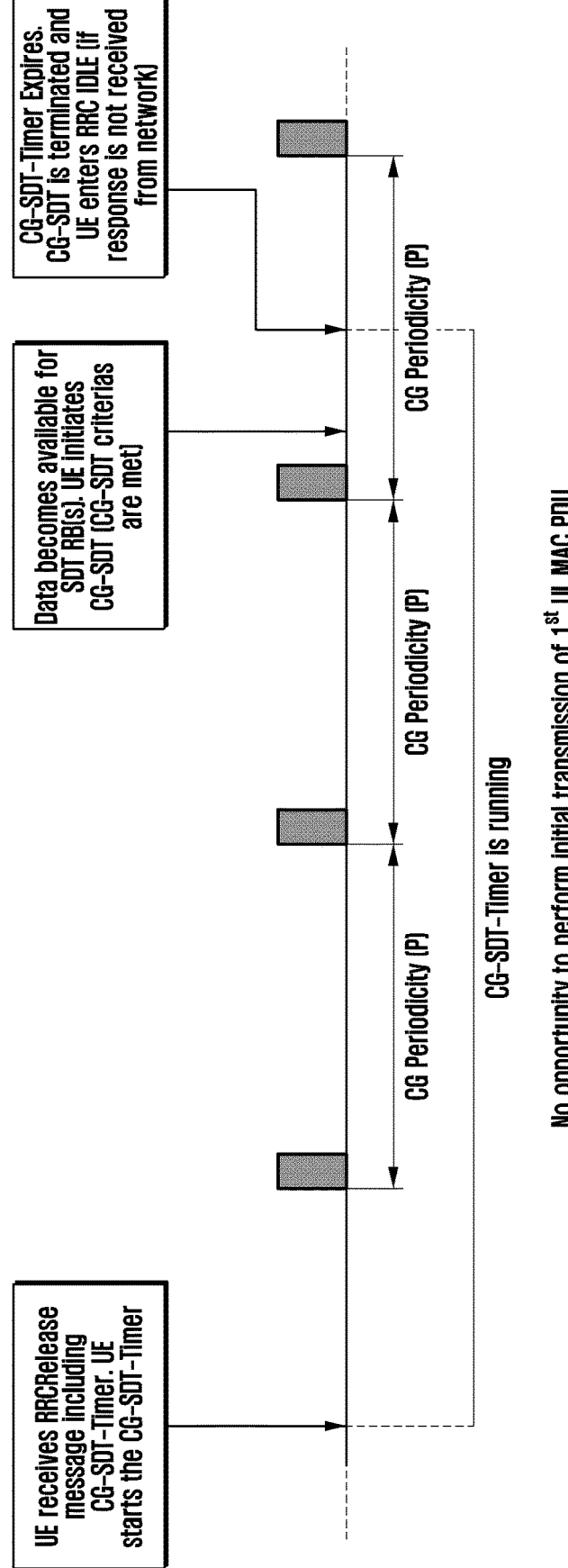
FIG. 5 illustrates a scenario where CG-SDT timer expires before the initial HARQ transmission of first UL MAC PDU carrying RRC resume request according to an embodiment of the disclosure.

FIG. 5 illustrates a scenario where CG-SDT timer expires before the initial HARQ transmission of first UL MAC PDU carrying RRC resume request according to an embodiment of the disclosure.

Referring to FIG. 5, CG-SDT timer may expire before the initial HARQ transmission of first UL MAC PDU carrying RRC resume request. As a result, there is no opportunity for UE to transmit the first UL MAC PDU. As per the current procedure, if CG-SDT timer expires during CG-SDT before receiving response from network for the first UL MAC PDU transmission, UE transition to RRC IDLE. So in the scenario of FIG. 5, UE transition to RRC IDLE. This is inefficient and UE would need to initiate connection setup procedure in RRC IDLE to transmit data resulting in increased latency and UE power consumption.

Figure 6:
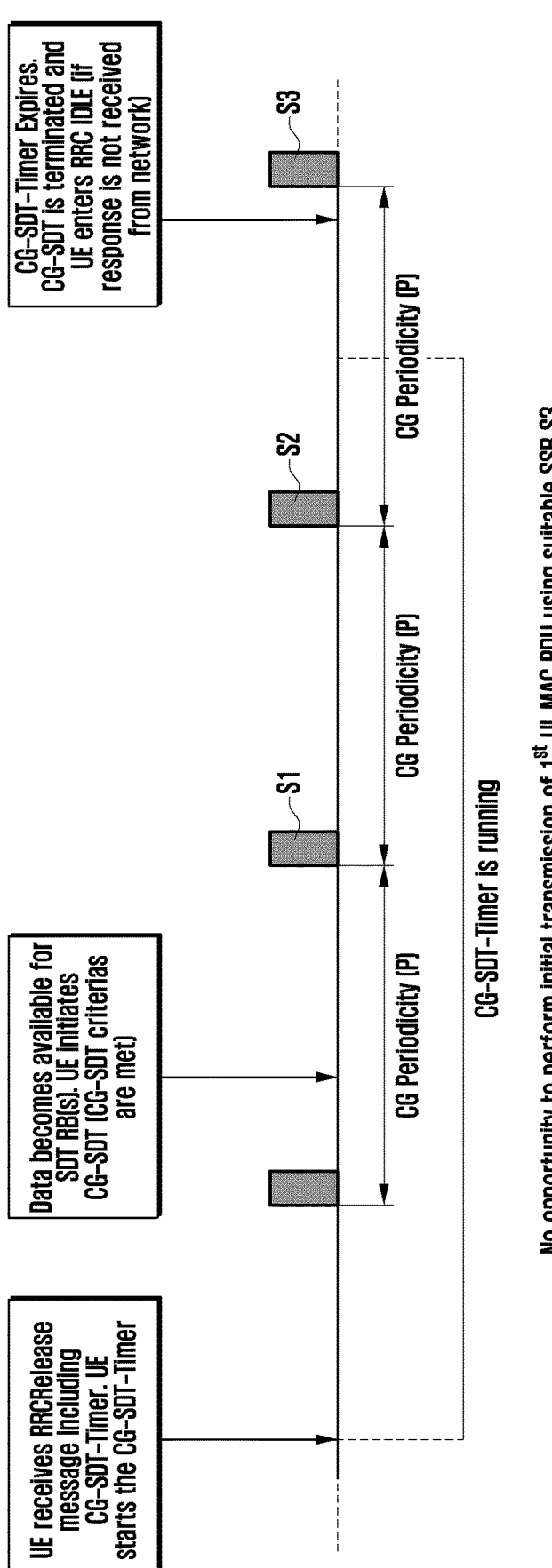
FIG. 6 illustrates a scenario where before the initial HARQ transmission of first UL MAC PDU carrying RRC

FIG. 6 illustrates a scenario where before the initial HARQ transmission of first UL MAC PDU carrying RRC resume request using a suitable SSB according to an embodiment of the disclosure.

Referring to FIG. 6, CG-SDT timer may expire before the initial HARQ transmission of first UL MAC PDU carrying RRC resume request using a suitable SSB. In the example, suitable SSB (SSB with SS-RSRP>threshold) is SSB 3 and CG-SDT timer expires before the first CG occasion corresponding to SSB 3 is available after the initiation of CG-SDT. As a result, there is no opportunity for UE to transmit first UL MAC PDU. As per the current procedure, if CG-SDT timer expires during CG-SDT before receiving response from network for the first UL MAC PDU transmission, UE transition to RRC IDLE. So in the scenario of FIG. 6, UE transition to RRC IDLE. This is inefficient and UE would need to initiate connection setup procedure in RRC IDLE to transmit data resulting in increased latency and UE power consumption.

In accordance with an embodiment, a method for handling CG-SDT timer expiry during the ongoing CG-SDT procedure is provided.

FIG. 7 illustrates an operation of a UE according to an embodiment of the disclosure. The operations illustrated in FIG. 7 are only shown for convenience of understanding and may be omitted if they are not related to the essential features of the disclosure.

UE is in RRC_CONNECTED state. UE may receive, in operation S700, RRCRelease message from gNB with suspend configuration. RRCRelease message indicates CG resources for SDT. UE may enter RRC_INACTIVE state upon receiving RRCRelease message with suspend configuration.

Alternatively, UE may be in RRC_INACTIVE state. UE may receive, in operation S700, RRCRelease message from gNB with suspend configuration during the SDT procedure in RRC_INACTIVE state. RRCRelease message may indicate CG resources for SDT.

UE may start, in operation S705, CG-SDT timer (also referred as the timing alignment timer for CG-SDT) upon receiving RRCRelease message including CG resources for SDT. The value of CG-SDT timer may be received in RRCRelease message.

In operation S710, while in RRC_INACTIVE state, upon arrival of data for one or more SDT RB(s), SDT criteria (DL RSRP of cell is above RSRP threshold, data available for SDT RB(s) is below the data volume threshold, etc.) is met and criteria to initiate CG-SDT is met, UE may initiate, in operation S715, CG-SDT procedure. UE may initiate CG-SDT only if cell is not changed (i.e. UE is in same cell from which UE has last received RRC Release message) and TA is valid (e.g. CG-SDT-Timer is running) and CG resources for SDT are configured and at least one SSB associated with CG resources is above a configured threshold. Upon initiation of SDT procedure, UE may start SDT timer or SDT error detection timer. Note that the SDT timer may be different from CG-SDT timer. This SDT timer may be stopped upon completion of SDT procedure.

While the CG-SDT procedure is ongoing, CG-SDT timer may expire, in operation S720. In this embodiment of the disclosure, UE operation upon expiry of CG-SDT timer while CG-SDT procedure is ongoing is as follows:

*UE may stop using the CG-SDT resources; and/or

*If UE has not yet transmitted the initial UL MAC PDU including CCCH message (which may comprise RRCResumeRequest/RRCResumeRequest1) during the ongoing SDT procedure as determined in operation S722:

In operation S725, UE may terminate the ongoing CG-SDT procedure. UE may remain in RRC_INACTIVE state. UE may initiate a random access-based SDT procedure as described above in FIGS. 1 and 2** (hereinafter RA-SDT), if RA-SDT criteria are met. If RA-SDT criteria are not met, UE may initiate non SDT connection resume procedure.

*Else (i.e. If UE has transmitted the initial UL MAC PDU including CCCH message during the ongoing SDT procedure) as determined in operation S722:

If UE has not yet received the response (e.g. hybrid automatic repeat request (HARQ) acknowledgement (ACK), or L1-ACK or PDCCH addressed to C-RNTI/SDT-RNTI, or UE has received RRC message or DCCH SDU, or PDCCH addressed to C-RNTI/SDT-RNTI scheduling a new Uplink or downlink transmission, etc.) from network for the initial UL MAC PDU including CCCH message transmitted by UE as determined in operation S724**:

*In operation S730**, UE may terminate ongoing SDT procedure; and/or

***In an example, upon termination, UE may enter RRC_IDLE, stop the SDT timer; reset MAC; set the variable pendingRNA-Update to false, if that is set to true; discard the UE Inactive AS context, if any; release the suspendConfig, if configured; discard the KgNB key, the KRRCenc key, the KRRCint key, the KUPint key and the KUpenc key, if any; release all or at least one of radio resources, including release of the RLC entity, the MAC configuration and the associated PDCP entity and SDAP for all or at least one of established RBs. In another example, upon termination UE may continue in RRC_INACTIVE; stop the SDT timer; reset MAC; set the variable pendingRNA-Update to false, if that is set to true; discard the UE Inactive AS context, if any; release the suspendConfig, if configured; discard the KgNB key, the KRRCenc key, the KRRCint key, the KUpint key and the KUpenc key, if any; suspend SRB1 and radio bearers configured for SDT; in the RRC_INACTIVE, UE may initiate RA-SDT procedure or initiate legacy RRC resume procedure.

Else (i.e. If UE has received the response) as determined in operation S724** the UE may:

*Not terminate (continue) ongoing SDT procedure, in operation S735**; and/or

***Suspend UL TX (except RA preamble and MsgA transmission); and/or

***Wait for PDCCH order from gNB; and/or

***Upon reception of PDCCH order, initiate random access procedure (In an alternate example, instead of waiting for PDCCH order, random access procedure can be initiated by UE. Details of random access procedure are as explained in the background); and/or

***Upon completion of random access procedure, resume UL TX; and/or

***During the SDT procedure, use dynamic grant (DG), i.e., grant allocated to UE using PDCCH addressed to C-RNTI/SDT-RNTI) for SDT.

Criteria of RA-SDT: RA-SDT criteria may be considered met, if all or at least one of the following conditions are met, 1) available data volume<=data volume threshold (data volume threshold is signaled by gNB and can be specific to RA-SDT or common for CG-SDT and RA-SDT).

2) RSRP (cell quality or RSRP of path loss reference) is greater than or equal to a configured threshold (threshold is signaled by gNB and can be specific to RA-SDT or common for CG-SDT and RA-SDT).

3) A set of Random Access resources for performing RA-SDT are selected on the selected UL carrier.

*Selected carrier may be the NUL, if SUL is not configured in the cell.

*Selected carrier may be the NUL, if SUL is configured in the cell but RA resources/ROs for SDT are not configured for SUL.

*Selected carrier may be the NUL, if SUL is configured in the cell and RSRP is greater than a threshold (threshold is signaled by gNB).

*Selected carrier may be the SUL, if SUL is configured in the cell and RSRP is not greater than a threshold (threshold is signaled by gNB).

*Selected carrier may be the SUL, if SUL is configured in the cell but RA resources/ROs for SDT are not configured for NUL.

*For each UL transmission, if RA resource/RO is available in time first for SUL, SUL may be selected for that UL transmission. If RA resource/RO is available in time first for NUL, NUL may be selected for that UL transmission.

Criteria for selecting CG-SDT: CG-SDT criteria may be considered met, if all or at least one of the following conditions are met, 1) available data volume<=data volume threshold (data volume threshold is signaled by gNB and can be specific to CG-SDT or common for CG-SDT and RA-SDT).

2) RSRP (cell quality or RSRP of path loss reference) is greater than or equal to a configured threshold (threshold is signaled by gNB and can be specific to CG-SDT or common for CG-SDT and RA-SDT).

3) CG-SDT resources are configured on the selected UL carrier and are valid (e.g. TA is valid (TAT-SDT timer is running), UE's cell is same as the cell from which CG resources are received).

*Selected carrier may be the NUL, if SUL is not configured in the cell.

*Selected carrier may be the NUL, if SUL is configured in the cell but CG resources for SDT are not configured for SUL.

*Selected carrier may be the NUL, if SUL is configured in the cell and RSRP is greater than a threshold (threshold is signaled by gNB).

*Selected carrier may be the SUL, if SUL is configured in the cell and RSRP is not greater than a threshold (threshold is signaled by gNB).

*Selected carrier may be the SUL, if SUL is configured in the cell but CG resources for SDT are not configured for NUL.

*For each UL transmission, if CG resource is available in time first for SUL, SUL may be selected for that UL transmission. If CG resource is available in time first for NUL, NUL may be selected for that UL transmission.

FIG. 8 illustrates an operation of a UE according to an embodiment of the disclosure. The operations illustrated in FIG. 8 are only shown for convenience of understanding and may be omitted if they are not related to the essential features of the disclosure.

Referring to FIG. 8, UE may be in RRC_CONNECTED state. UE may receive, in operation S800, RRCRelease message from gNB with suspend configuration. RRCRelease message may indicate CG resources for SDT. UE may enter RRC_INACTIVE state upon receiving RRCRelease message with suspend configuration.

Alternatively, UE may be in RRC_INACTIVE state. UE may receive, in operation S800, RRCRelease message from gNB with suspend configuration during the SDT procedure in RRC_INACTIVE state. RRCRelease message may indicate CG resources for SDT.

UE may start, in operation S805, CG-SDT timer (also referred as the timing alignment timer for CG-SDT) upon receiving RRCRelease message including CG resources for SDT. The value of CG-SDT timer may be received in RRCRelease message.

In operation S810, while in RRC_INACTIVE state, upon arrival of data for one or more SDT RB(s), if SDT criteria (DL RSRP of cell is above RSRP threshold, data available for SDT RB(s) is below the data volume threshold, etc.) is met:

*UE may check the remaining time for CG-SDT-Timer; and/or

*If during the remaining time, at least 'N' ($\geq 1$) CG occasions corresponding to suitable SSB (i.e. SSB whose SS-RSRP is above threshold) are not available as determined in operation S812:

**In operation S815, UE may not trigger CG-SDT. UE may initiate RA-SDT, if RA-SDT criteria are met. If RA-SDT criteria are not met, UE may initiate non SDT connection resume procedure.

**Parameter N can be pre-defined or configured by network (RRC signaling such as RRCRelease message or RRCReconfiguration message or SI)

*Else (i.e. If during the remaining time, at least 'N' CG occasions corresponding to suitable SSB (i.e. SSB whose SS-RSRP is above threshold) are available) as determined in operation S812:

**In operation S820, UE may trigger CG-SDT if all or at least one of other criteria to initiate CG-SDT is met, UE may initiate CG-SDT procedure. UE may initiate CG-SDT only if cell is not changed (i.e. UE is in same cell from which UE has last received RRC Release message) and TA is valid (e.g. CG-SDT-Timer is running) and CG resources for SDT are configured and at least one SSB associated with CG resources is above a configured threshold. Upon initiation of SDT procedure, UE may start SDT timer or SDT error detection timer. Note that the SDT timer may be different from CG-SDT timer. This SDT timer may be stopped upon completion of SDT procedure.

The examples of criteria for RA-SDT or CG-SDT is described above in FIG. 7.

In accordance with an embodiment, a method for radio link management (RLM) and/or beam failure detection (BFD) is provided.

In 5G, RLM is supported. UE is configured with RLM-RS resources(s). On each RLM-RS resource, the UE estimates the downlink radio link quality and compare it to the thresholds Qout and Qin. Qout: level at which the downlink radio link cannot be reliably received and corresponds to the out-of-sync block error rate (BLERout). Qin: level at which the downlink radio link quality can be received with higher reliability and correspond to the in-sync block error rate (BLERin). BLERout & BLERin is signaled. Out of sync indication is generated when downlink radio link quality on all or at least one of the configured RLM-RS resources is worse than Qout. In sync indication is generated when downlink radio link quality on at least one of the configured RLM-RS resources is better than Qin. RRC layer in UE performs RLM based on these indications. Upon receiving N310 consecutive "out-of-sync" indications for the SpCell from lower layers while neither T300, T301, T304, T311, T316 nor T319 are running, UE start timer T310 for the corresponding SpCell. Upon receiving N311 consecutive "in-sync" indications for the SpCell from lower layers while T310 is running, the UE may: stop timer T310 for the corresponding SpCell. If T310 expires, RLF is declared. The frequent evaluation for RLM may increase UE power consumption for low mobility UEs. So 5G supports RLM relaxation wherein the UE can relax measurements for RLM when certain criteria are met (low mobility and/or good serving cell quality).

In 5G, BFD is supported. UE is configured with BFD-RS resources(s). On each BFD-RS resource, the UE estimates the downlink radio link quality and compare it to the thresholds Qout_LR. Qout: level at which the downlink radio link cannot be reliably received and corresponds to the block error rate (BLERout_LR of 10%). Beam Failure Instance indication is generated when downlink radio link quality on all or at least one of the configured BFD-RS resources is worse than Qout_LR. MAC layer detects beam failure based on this indication and initiate beam failure recovery. The frequent evaluation for BFD may increase UE power consumption for low mobility UEs. So 5G supports BFD relaxation wherein the UE can relax measurements for BFD when certain criteria are met (low mobility and/or good serving cell quality).

In 5G the relaxed measurement criterion for low mobility is defined as follows:

The relaxed measurement criterion for UE with low mobility in RRC_CONNECTED is fulfilled when:
*(SS-RSRPRef−SS-RSRP)<SSearchDeltaP-Connected, Where:
*SS-RSRP=current L3 RSRP measurement of the SpCell based on SSB (dB).
*SS-RSRPRef=reference L3 RSRP measurement of the SpCell based on SSB (dB), set as follows:
**After receiving low mobility criterion configuration, or
**After MAC of the CG successfully completes a Random Access procedure after applying a reconfigurationWithSync in spCellConfig of the CG while low mobility criterion is configured, or
**If (SS-RSRP−SS-RSRPRef)>0, or
**If the relaxed measurement criterion has not been met for TSearchDeltaP-Connected:
***The UE may set the value of SS-RSRPRef to the current SS-RSRP value of the SpCell.
**SSearchDeltaP-Connected is signaled by gNB in RRCReconfiguration message
**TSearchDeltaP-Connected is signaled by gNB in RRCReconfiguration message In 5G the relaxed measurement criterion for good serving cell quality is defined as follows:

The relaxed measurement criterion of good serving cell quality for RLM starts to be evaluated after receiving the good serving cell quality criterion configuration and is fulfilled when the downlink radio link quality on the configured RLM-RS resource is evaluated to be better than the threshold Qin+XdB, wherein
*Qin is specified in section 8.1 of TS 38.133.

*X is the parameter offset in goodServingCellEvaluation-RLM where goodServingCellEvaluationRLM is signaled by gNB in serving cell configuration of SpCell.

The relaxed measurement criterion of good serving cell quality for BFD starts to be evaluated after receiving the good serving cell quality criterion configuration and is fulfilled when the downlink radio link quality on the configured BFD-RS resource is evaluated to be better than the threshold Qin+XdB, wherein
*Qin is specified in section 8.1 of TS 38.133.
*X is the parameter offset in goodServingCellEvaluation-BFD where goodServingCellEvaluationBFD is signaled by gNB in serving cell configuration of serving cell(s).

In an example, the UE may:
1> if configured to provide the relaxation state of RLM measurements of a cell group:
2> if the UE did not transmit a UEAssistanceInformation message with rlm-MeasRelaxationState since it was configured to provide the relaxation state of RLM measurements for the cell group; or
2> if the relaxation state of RLM measurements for the cell group has changed since the last transmission of the UEAssistanceInformation message including rlm-MeasRelaxationState of the cell group and timer T34x associated with the cell group is not running:
3> start timer T34x with the timer value set to the rlm-RelaxtionReportingProhibitTimer (signaled by gNB in RRCReconfiguration message);
3> initiate transmission of the UEAssistanceInformation message to provide the relaxation state of RLM measurements of the cell group;
1> if configured to provide the relaxation state of BFD measurements of serving cells of a cell group:
2> if the UE did not transmit a UEAssistanceInformation message with bfd-MeasRelaxationState since it was configured to provide the relaxation state of BFD measurements for the cell group; or
2> if the relaxation state of BFD measurements in any serving cell of the cell group has changed since the last transmission of the UEAssistanceInformation message including bfd-MeasRelaxationState of the cell group and timer T34y associated with the cell group is not running:
3> start timer T34y with the timer value set to the bfd-RelaxtionReportingProhibitTimer (signaled by gNB in RRCReconfiguration message);
3> initiate transmission of the UEAssistanceInformation message to provide the relaxation state of BFD measurements of serving cells of the cell group.
1> if configured to provide the relaxation state of BFD measurements of serving cells of a cell group:
2> if the UE did not transmit a UEAssistanceInformation message with bfd-MeasRelaxationState since it was configured to provide the relaxation state of BFD measurements for the cell group; or
2> if the relaxation state of BFD measurements in any SCell of the cell group has changed since the last transmission of the UEAssistanceInformation message including bfd-MeasRelaxationState of the cell group and timer T34y associated with the cell group is not running; or
2> if the relaxation state of BFD measurements in SpCell of the cell group has changed since the last transmission of the UEAssistanceInformation message including bfd-MeasRelaxationState of the cell group:

3> start timer T34$y$ with the timer value set to the bfd-RelaxtionReportingProhibitTimer (signaled by gNB in RRCReconfiguration message);

3> initiate transmission of the UEAssistanceInformation message to provide the relaxation state of BFD measurements of serving cells of the cell group.

1> if transmission of the UEAssistanceInformation message is initiated to provide the relaxation state of RLM measurements of a cell group:

2> if the UE performs RLM measurement relaxation on the cell group:

3> set the rlm-MeasRelaxationState to true;

2> else:

3> set the rlm-MeasRelaxationState to false;

1> if transmission of the UEAssistanceInformation message is initiated to provide the relaxation state of BFD measurements of a cell group:

2> for each serving cell of the cell group:

3> if the UE performs BFD measurement relaxation on this serving cell:

4> set the n-th bit of bfd-MeasRelaxationState to '1', where n is equal to the servCellIndex value+1 of the serving cell;

3> else:

4> set the n-th bit of bfd-MeasRelaxationState to '0', where n is equal to the servCellIndex value+1 of the serving cell.

If the relaxation state of RLM measurements for the cell group has changed since the last transmission of the UEAssistanceInformation message including rlm-MeasRelaxationState of the cell group and timer T34$x$ associated with the cell group is running, UE cannot transmit UEAssistanceInformation message including rlm-MeasRelaxationState. As a result, UE and gNB will not be in sync with respect to relaxation state for RLM.

If the relaxation state of BFD measurements in any serving cell of the cell group has changed since the last transmission of the UEAssistanceInformation message including bfd-MeasRelaxationState of the cell group and timer T34$y$ associated with the cell group is running: UE cannot transmit UEAssistanceInformation message including bfd-MeasRelaxationState. As a result, UE and gNB will not be in sync with respect to relaxation state for BFD.

Solution 1

If the relaxation state of RLM measurements for the cell group has changed from 'relaxation' to 'no relaxation' (i.e. criteria (low mobility and/or good serving cell quality) for relaxation are no longer met) for the cell group and timer T34$x$ associated with the cell group is running:

*In one example, UE immediately go to no relaxation mode i.e. it stops applying RLM relaxation.

*In another example, UE continues to apply relaxation until the timer T34$x$ associated with the cell group expires.

Solution 2

If the relaxation state of RLM measurements for the cell group has changed from 'no relaxation' to 'relaxation' (i.e. criteria (low mobility and/or good serving cell quality) for relaxation are met) for the cell group and timer T34$x$ associated with the cell group is running:

*In one example, UE immediately go to relaxation mode i.e. it starts applying RLM relaxation.

*In another example, UE continues to not apply relaxation until the timer T34$x$ associated with the cell group expires.

Solution 3

If the relaxation state of BFD measurements of a cell of a cell group has changed from 'relaxation' to 'no relaxation' (i.e. criteria (low mobility and/or good serving cell quality) for relaxation are no longer met) for the cell and timer T34$y$ associated with the cell group is running:

*In one example, UE immediately go to no relaxation mode i.e. it stops applying BFD relaxation.

*In another example, UE continues to apply relaxation until the timer T34$y$ associated with the cell group expires.

Solution 4

If the relaxation state of BFD measurements of a cell of a cell group has changed from 'no relaxation' to 'relaxation' (i.e. criteria (low mobility and/or good serving cell quality) for relaxation are met) for the cell group and timer T34$y$ associated with the cell group is running:

*In one example, UE immediately go to relaxation mode i.e. it starts applying BFD relaxation.

*In another example, UE continues to not apply relaxation until the timer T34$y$ associated with the cell group expires.

FIG. 9 is a block diagram of a terminal according to an embodiment of the disclosure.

Referring to FIG. 9, a terminal includes a transceiver 910, a controller 920 and a memory 930. The controller 920 may refer to a circuitry, an application-specific integrated circuit (ASIC), or at least one processor. The transceiver 910, the controller 920 and the memory 930 are configured to perform the operations of the UE illustrated in the figures, e.g. FIGS. 1 to 8, or described above. Although the transceiver 910, the controller 920 and the memory 930 are shown as separate entities, they may be realized as a single entity like a single chip. Or, the transceiver 910, the controller 920 and the memory 930 may be electrically connected to or coupled with each other.

The transceiver 910 may transmit and receive signals to and from other network entities, e.g., a base station.

The controller 920 may control the UE to perform functions according to one of the embodiments described above.

For example, the controller 920 is configured to receive, via the transceiver, an RRC release message including suspend configuration information and CG-SDT configuration information, start a timer related to a TA for CG-SDT based on the CG-SDT configuration information, identify that criteria for an SDT procedure is met, and in case that any CG occasion corresponding to an SSB with an RSRP above a threshold value is not available while the timer related to the TA for CG-SDT is running, and criteria for an RA-SDT procedure is met, perform the RA-SDT procedure.

In an embodiment, the operations of the terminal may be implemented using the memory 930 storing corresponding program codes. Specifically, the terminal may be equipped with the memory 930 to store program codes implementing desired operations. To perform the desired operations, the controller 920 may read and execute the program codes stored in the memory 930 by using a processor or a central processing unit (CPU).

FIG. 10 is a block diagram of a base station according to an embodiment of the disclosure.

Referring to FIG. 10, a base station includes a transceiver 1010, a controller 1020 and a memory 1030. The transceiver 1010, the controller 1020 and the memory 1030 are configured to perform the operations of the network (e.g., gNB) illustrated in the figures, e.g. FIGS. 1 to 8, or described above. Although the transceiver 1010, the controller 1020 and the memory 1030 are shown as separate entities, they may be realized as a single entity like a single chip. The transceiver 1010, the controller 1020 and the memory 1030 may be electrically connected to or coupled with each other.

The transceiver 1010 may transmit and receive signals to and from other network entities, e.g., a terminal.

The controller 1020 may control the base station to perform functions according to one of the embodiments described above. The controller 1020 may refer to a circuitry, an ASIC, or at least one processor.

For example, the controller 1020 is configured to transmit, via the transceiver, an RRC release message including suspend configuration information and CG-SDT configuration information, and perform an RA-SDT procedure or an CG-SDT procedure.

In an embodiment, the operations of the base station may be implemented using the memory 1030 storing corresponding program codes. Specifically, the base station may be equipped with the memory 1030 to store program codes implementing desired operations. To perform the desired operations, the controller 1020 may read and execute the program codes stored in the memory 1030 by using a processor or a CPU.

While the disclosure has been shown and described with reference to various embodiments thereof, it will be understood by those skilled in the art that various changes in form and details may be made therein without departing from the spirit and scope of the disclosure as defined by the appended claims and their equivalents.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a wireless communication system, the method comprising:

receiving a radio resource control (RRC) release message including configured grant-small data transmission (CG-SDT) configuration information;

starting a timer related to a time alignment (TA) for CG-SDT based on the CG-SDT configuration information;

identifying that criteria for a small data transmission (SDT) procedure are met; and in case that a configured grant (CG) occasion corresponding to a synchronization signal block (SSB) with a reference signal received power (RSRP) above a threshold value is not available until the timer related to the TA for CG-SDT expires, and in case that criteria for a random access-small data transmission (RA-SDT) procedure are met, performing the RA-SDT procedure.

2. The method of claim 1, further comprising:

in case that at least one CG occasion corresponding to the SSB with the RSRP above the threshold value is available while the timer related to the TA for CG-SDT is running, and criteria for a CG-SDT procedure are met, performing the CG-SDT procedure.

3. The method of claim 1, wherein in case that the CG occasion corresponding to the SSB with the RSRP above the threshold value is not available until the timer related to the TA for CG-SDT expires, and the criteria for the RA-SDT procedure are not met, the SDT procedure is not initiated.

4. The method of claim 1, wherein the threshold value is configured by the CG-SDT configuration information.

5. The method of claim 1, wherein in case that a volume of data of at least one radio bearer (RB) configured for the SDT procedure is less than or equal to a data volume threshold and a downlink RSRP is higher than an RSRP threshold, the criteria for the SDT procedure are met.

6. The method of claim 1, further comprising:

entering an RRC inactive state based on suspend configuration information in the RRC release message.

7. The method of claim 1, wherein the RA-SDT procedure is performed based on a 2-step random access or a 4-step random access.

8. The method of claim 2, wherein the CG-SDT procedure is performed on a same cell on which the RRC release message is received.

9. A terminal in a wireless communication system, the terminal comprising:

a transceiver; and a controller configured to:

receive, via the transceiver, a radio resource control (RRC) release message including configured grant-small data transmission (CG-SDT) configuration information, start a timer related to a time alignment (TA) for CG-SDT based on the CG-SDT configuration information, identify that criteria for a small data transmission (SDT) procedure are met, and in case that a configured grant (CG) occasion corresponding to a synchronization signal block (SSB) with a reference signal received power (RSRP) above a threshold value is not available until the timer related to the TA for CG-SDT expires, and in case that criteria for a random access-small data transmission (RA-SDT) procedure are met, perform the RA-SDT procedure.

10. The terminal of claim 9, wherein the controller is further configured to:

in case that at least one CG occasion corresponding to the SSB with the RSRP above the threshold value is available while the timer related to the TA for CG-SDT is running, and criteria for a CG-SDT procedure are met, perform the CG-SDT procedure.

11. The terminal of claim 9, wherein in case that the CG occasion corresponding to the SSB with the RSRP above the threshold value is not available until the timer related to the TA for CG-SDT expires, and the criteria for the RA-SDT procedure are not met, the SDT procedure is not initiated.

12. The terminal of claim 9, wherein the threshold value is configured by the CG-SDT configuration information.

13. The terminal of claim 9, wherein in case that a volume of data of at least one radio bearer (RB) configured for the SDT procedure is less than or equal to a data volume threshold and a downlink RSRP is higher than an RSRP threshold, the criteria for the SDT procedure are met.

14. The terminal of claim 9, wherein the controller is further configured to:

enter an RRC inactive state based on suspend configuration information in the RRC release message.

15. The terminal of claim 9, wherein the RA-SDT procedure is performed based on a 2-step random access or a 4-step random access.

16. The terminal of claim 10, wherein the CG-SDT procedure is performed on a same cell on which the RRC release message is received.

* * * * *